US012615118B2

(12) United States Patent
Wu et al.

(10) Patent No.: US 12,615,118 B2
(45) Date of Patent: Apr. 28, 2026

(54) METHOD AND DEVICE FOR RESOURCE GROUP SPATIAL RELATIONSHIPS IN WIRELESS COMMUNICATION

(71) Applicant: Apogee Networks, LLC, Plano, TX (US)

(72) Inventors: Keying Wu, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 681 days.

(21) Appl. No.: 17/903,047

(22) Filed: Sep. 6, 2022

(65) Prior Publication Data

US 2022/0416981 A1 Dec. 29, 2022

Related U.S. Application Data

(63) Continuation of application No. PCT/CN2021/079688, filed on Mar. 9, 2021.

(30) Foreign Application Priority Data

Mar. 13, 2020 (CN) .......................... 202010176592.8
Apr. 21, 2020 (CN) .......................... 202010315167.2

(51) Int. Cl.
*H04W 72/04* (2023.01)
*H04L 5/00* (2006.01)

(52) U.S. Cl.
CPC .......... *H04L 5/0053* (2013.01); *H04L 5/0035* (2013.01)

(58) Field of Classification Search
CPC .... H04L 5/0053; H04L 5/0035; H04W 72/23; H04W 72/20; H04W 72/00; H04W 72/27; H04W 84/047; H04W 72/04
See application file for complete search history.

(56) References Cited

U.S. PATENT DOCUMENTS

2020/0014510 A1 1/2020 Wu
2020/0127788 A1* 4/2020 Wu ........................ H04L 5/0053
(Continued)

FOREIGN PATENT DOCUMENTS

CN 110582982 A 12/2019
CN 110603773 A 12/2019
(Continued)

OTHER PUBLICATIONS

Nokia et al., âEnhancements on Multi-TRP/Panel Transmissionâ, 3GPP TSG RAN WG1 #98bis Meeting R1-1910915, Oct. 20, 2019 (Year: 2019).*

(Continued)

*Primary Examiner* — Marcus Smith
*Assistant Examiner* — Zhaohui Yang
(74) *Attorney, Agent, or Firm* — Volpe Koenig

(57) ABSTRACT

The present disclosure provides a method and a device in a node for wireless communications. A first node receives a first information block; and monitors a first-type signaling in a first resource pool. The first information block is used for determining the first resource pool, the first resource pool comprises K resource sets, any resource set comprises a positive integer number of resource group(s); a first resource set is one of the K resource sets, a first index is an index of the first resource set in a first resource sub-pool, a number of resource groups comprised in the first resource set is equal to L0, and a number of resource groups comprised in any resource set in the first resource sub-pool is equal to L0. The above method improves reliability of physical layer control channel transmission.

17 Claims, 6 Drawing Sheets

Resource group subset#0 ... Resource group subset#(M-1)

Spatial relation#0 ... Spatial relation#(M-1)

Reference signal#0 ... Reference signal#(M-1)

(56) References Cited

U.S. PATENT DOCUMENTS

| | | | |
|---|---|---|---|
| 2020/0314860 A1* | 10/2020 | Zhou | H04W 72/23 |
| 2021/0345300 A1* | 11/2021 | Selvanesan | H04W 72/02 |
| 2022/0038244 A1* | 2/2022 | Zhang | H04L 1/1861 |

FOREIGN PATENT DOCUMENTS

| | | |
|---|---|---|
| CN | 110677909 A | 1/2020 |
| CN | 110690948 A | 1/2020 |

OTHER PUBLICATIONS

ISR received in application No. PCT/CN2021/079688 dated May 26, 2021.

First Search Report of Chinses patent application No. CN202010176592.8 dated Mar. 11, 2022.

First Search Report of Chinses patent application No. CN202010315167.2 dated Feb. 10, 2022.

Notification to Grant Patent Right for Invention of Chinses patent application No. CN202010176592.8 dated Mar. 18, 2022.

Notification to Grant Patent Right for Invention of Chinses patent application No. CN202010315167.2 dated Feb. 16, 2022.

3rd Generation Partnership Project; Technical Specification Group Radio Access Network;Evolved Universal Terrestrial Radio Access (E-UTRA);Physical Channels and Modulation(Release 9) 36211-910 3GPP TS 36.211 V9.1.0 (Mar. 2010) Aug. 20, 2010.

Vivo Further Discussion on Multi-TRP Transmission 3GPP TSG RAN WG1 #96bis R1-1904096 Mar. 30, 2019.

Nokia, Nokia Shanghai Bell Enhancements on Multi-TRP/Panel Transmission 3GPP TSG RAN WG1 #98bis Meeting R1-1910915 Oct. 4, 2019.

Nokia, Nokia Shanghai Bell (TP for NR-IAB BL CR for TS 38.473) BH RLC channel mapping configuration in Donor-DU and intermediate IAB nodes 3GPP TSG-RAN WG3 Meeting #107bis-e R3-202432 Apr. 10, 2020.

ZTE Further details on multi-beam/TRP operation 3GPP TSG RAN WG1 Meeting #98bis R1-1910287 Oct. 5, 2019.

Third Generation Partnership Project, "Technical Specification Group Radio Access Network; NR; Physical channels and modulation (Release 16)," 3GPP TS 38.211 V16.0.0 (Dec. 2019).

Third Generation Partnership Project, "Technical Specification Group Radio Access Network; NR; Multiplexing and channel coding (Release 16)," 3GPP TS 38.212 V16.0.0 (Dec. 2019).

Third Generation Partnership Project, "Technical Specification Group Radio Access Network; NR; Physical layer procedures for control (Release 15)," 3GPP TS 38.213 V16.0.0 (Dec. 2019).

Third Generation Partnership Project, "Technical Specification Group Radio Access Network NR Radio Resource Control (RRC) protocol specification (Release 15)," 3GPP TS 38.331 V15.8.0 (Dec. 2019).

* cited by examiner

100

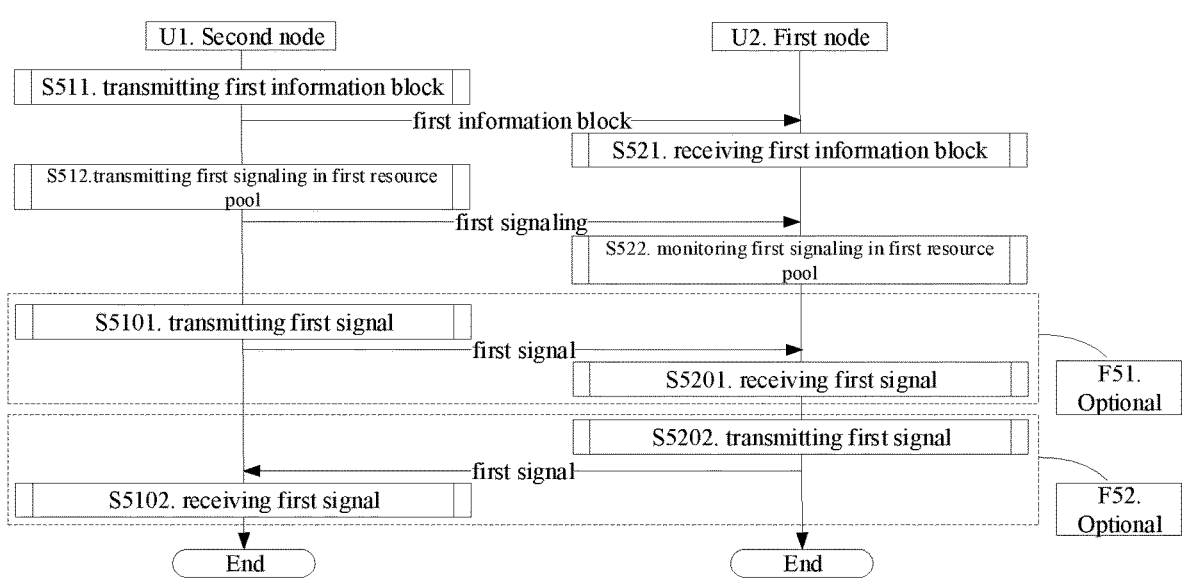
FIG. 5
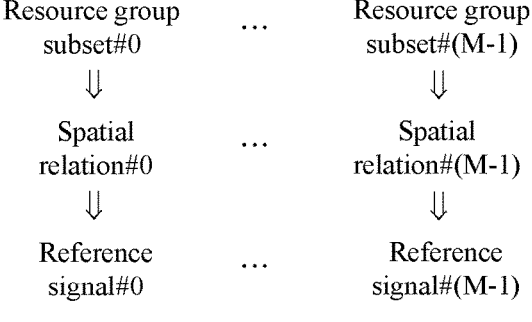
First resource group related to at least one of first index or second index
subset
FIG. 6
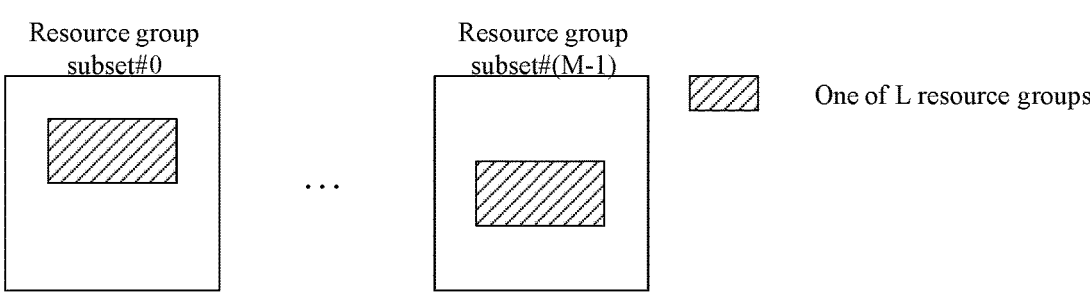
FIG. 7
Resource group                    Resource group
subset#0                          subset#(M-1)
FIG. 8

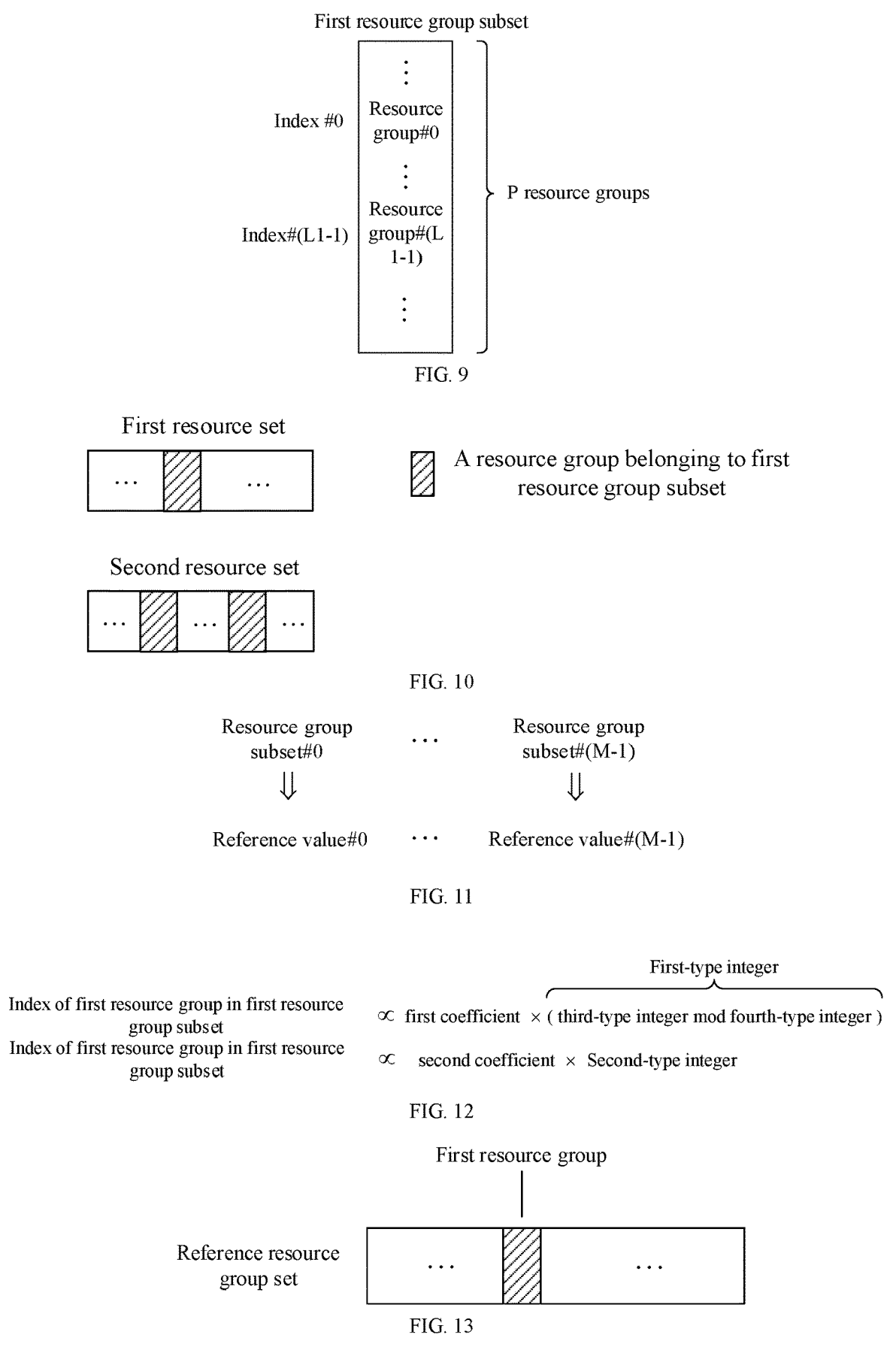

First resource group subset

Index #0     Resource group#0

Index#(L1-1)     Resource group#(L1-1)

P resource groups

FIG. 9

First resource set

▨ A resource group belonging to first resource group subset

Second resource set

FIG. 10

Resource group subset#0    ...    Resource group subset#(M-1)

⇓                 ⇓

Reference value#0    ...    Reference value#(M-1)

FIG. 11

First-type integer

Index of first resource group in first resource group subset    $\propto$ first coefficient $\times$ ( third-type integer mod fourth-type integer )

Index of first resource group in first resource group subset    $\propto$ second coefficient $\times$ Second-type integer

FIG. 12

First resource group

Reference resource group set

FIG. 13

Resource group set #0

Resource group set #(M-1)

Resource
group
subset#0

Resource
group
subset#(M-1)

. . .

1500

First processor
1501

First
node

First receiver
1502

1600

Second processor
1601

Second
node

First transmitter
1602

1700

First node

1701 receiving first information block

1702 receiving first signaling in first resource pool

1703 transmitting first signal in first radio resource block

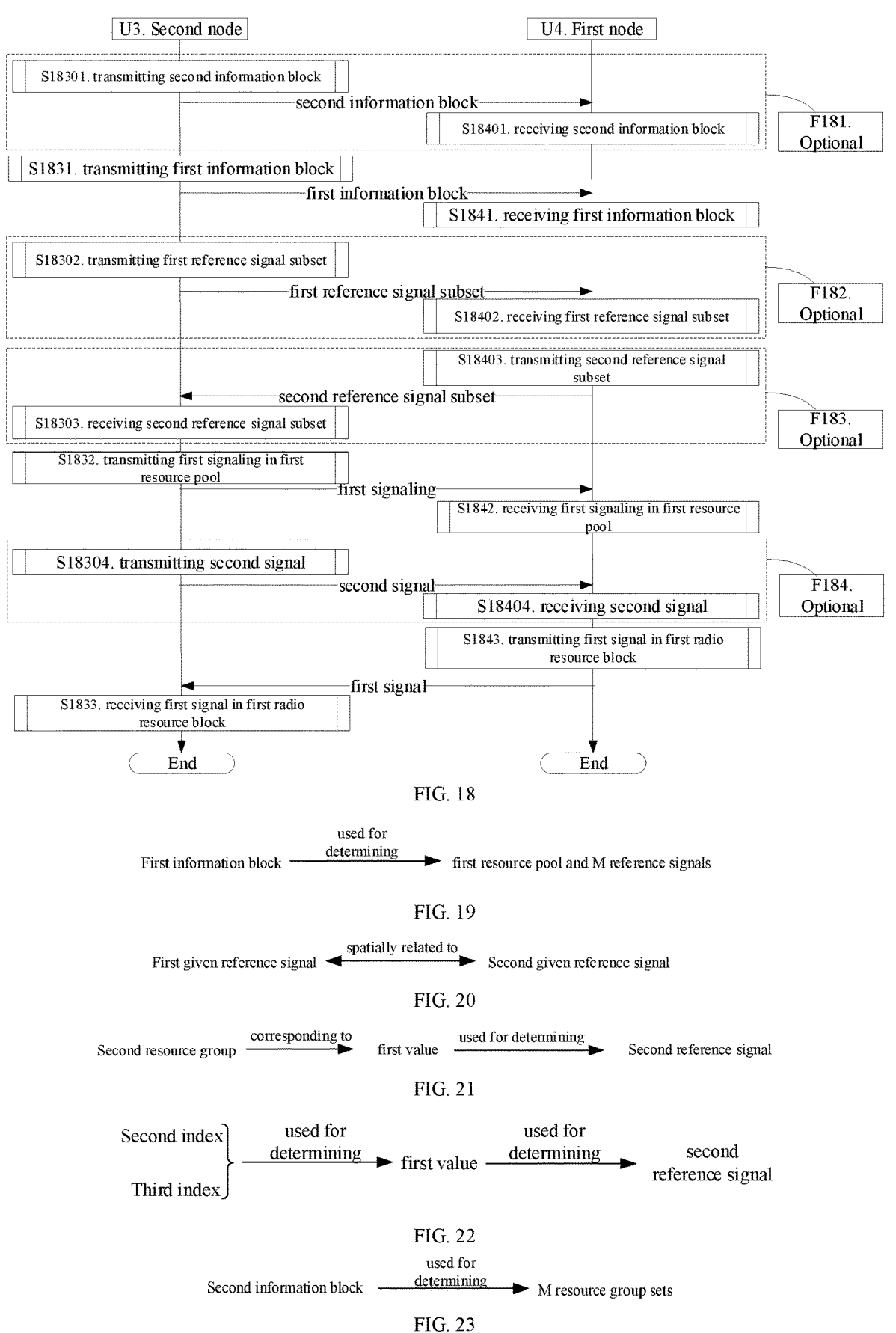

FIG. 18

First information block ──used for determining──▶ first resource pool and M reference signals

FIG. 19

First given reference signal ◀──spatially related to──▶ Second given reference signal

FIG. 20

Second resource group ──corresponding to──▶ first value ──used for determining──▶ Second reference signal

FIG. 21

Second index ⎫
           ⎬ ──used for determining──▶ first value ──used for determining──▶ second reference signal
Third index ⎭

FIG. 22

Second information block ──used for determining──▶ M resource group sets

FIG. 23

METHOD AND DEVICE FOR RESOURCE GROUP SPATIAL RELATIONSHIPS IN WIRELESS COMMUNICATION

CROSS REFERENCE TO RELATED APPLICATIONS

This application is the continuation of International patent application PCT/CN2021/079688, filed on Mar. 9, 2021, which claims the priority benefit of Chinese Patent Application No. 202010176592.8, filed on Mar. 13, 2020, and the priority benefit of Chinese Patent Application No. 202010315167.2, filed on Apr. 21, 2020, the full disclosure of which is incorporated herein by reference.

BACKGROUND

Technical Field

The present disclosure relates to transmission methods and devices in wireless communication systems, and in particular to a method and device of radio signal transmission in wireless communication systems supporting cellular networks.

Related Art

Multi-antenna technology is a key technique in both 3rd Generation Partner Project (3GPP) Long-term Evolution (LTE) and New Radio (NR) systems. By configuring multiple antennas at a communication node, for instance, at a base station or a User Equipment (UE) to acquire extra spatial degrees of freedom. The multiple antennas form through beamforming a beam pointing in a specific direction to improve communication quality. When the multiple antennas belong to multiple Transmitter Receiver Points (TRPs)/panels, the spatial differences among these TRPs/panels can be utilized to get extra diversity gains. In NR Release (R) version 16, multi-TRP/panel transmission is used to enhance transmission quality of downlink physical layer data channels.

SUMMARY

In NR R17 and its subsequent versions, transmission schemes based on multi-TRP/panel will continue to be evolved and enhanced, one important aspect of which is to enhance transmission quality of physical layer control channels. To address the above problem, the present disclosure provides a solution.

In 3GPP systems, time-frequency resources occupied by the scheduling signaling of downlink data are used for determining the uplink physical control channel for Hybrid Automatic Repeat reQuest-ACKnowledgement (HARQ-ACK). With multi-TRP/panel-based control channels, how to determine the uplink physical control channel needs to be solved. To address the above problem, the present disclosure provides a solution.

It should be noted that though the present disclosure only took transmission scenarios of multi-TRP/panel transmission and physical layer control channels for example in the statement above, it is also applicable to other scenarios of signal-TRP/panel transmission, Carrier Aggregation, or V2X communication scenarios and other physical layer channels, where similar technical effects can be achieved. Additionally, the adoption of a unified solution for various scenarios (including but not limited to multi-TRP/panel transmission, signal-TRP/panel transmission, Carrier Aggregation, V2X, transmission of physical layer control channels and other physical layer channels) contributes to the reduction of hardware complexity and costs. If no conflict is incurred, embodiments in a first node in the present disclosure and the characteristics of the embodiments are also applicable to a second node, and vice versa. And the embodiments in the present disclosure and the characteristics in the embodiments can be arbitrarily combined if there is no conflict.

The present disclosure provides a method in a first node for wireless communications, comprising:

receiving a first information block;

monitoring a first-type signaling in a first resource pool;

herein, the first information block is used for determining the first resource pool; the first resource pool comprises K resource sets, K being a positive integer greater than 1; any of the K resource sets comprises a positive integer number of resource group(s), any resource group in the first resource pool belongs to one of M resource group subsets, M being a positive integer number greater than 1; a first resource set is one of the K resource sets, a first index is an index of the first resource set in a first resource sub-pool, and a number of resource group(s) comprised in the first resource set is equal to L0, L0 being a positive integer; the first resource sub-pool comprises K1 resource set(s) in the K resource sets, and a number of resource group(s) comprised in any resource set in the first resource sub-pool is equal to the L0, K1 being a positive integer not greater than the K; the first resource set comprises a first resource group, and a second index is an index of the first resource group in the first resource set; the first resource group belongs to a first resource group subset in the M resource group subsets, and the first resource group subset is related to at least one of the first index or the second index.

In one embodiment, a problem to be solved in the present disclosure includes: how to utilize multi-TRP/panel transmission to enhance transmission quality of a physical layer control channel. The above method allows that different Physical Downlink Control Channels (PDCCH) candidates in a search space set or different Control Channel Elements (CCE) in a same PDCCH candidate correspond to different spatial relations, thus solving the problem.

In one embodiment, characteristics of the above method include that the M resource group subsets respectively correspond to different spatial relations, and in the above method, CCEs corresponding to different spatial relations are used for generating a PDCCH candidate in the first resource pool.

In one embodiment, advantages of the above method include that multi-TRP/panel transmission of a physical layer control channel is realized, thus improving reliability of physical layer control channel transmission.

According to one aspect of the present disclosure, wherein a first signaling is received in the first resource pool, and the first signaling is the first-type signaling.

According to one aspect of the present disclosure, the method in a first node for wireless communications comprises:

receiving a first signal;

herein, the first signaling comprises scheduling information of the first signal.

According to one aspect of the present disclosure, the method in a first node for wireless communications comprises:

transmitting a first signal;

herein, the first signaling comprises scheduling information of the first signal.

According to one aspect of the present disclosure, wherein the M resource group subsets respectively correspond to M spatial relations, and the M spatial relations respectively indicate M reference signals.

According to one aspect of the present disclosure, wherein when the L0 is equal to L and the L is a positive integer not less than the M, the first resource set comprises L resource groups, for any given resource group subset in the M resource group subsets, there exists a resource group in the L resource groups belonging to the given resource group subset.

In one embodiment, advantages of the above method include that spatial diversity of PDCCH candidates are maximized, which improves transmission performance of a physical layer control channel in a single PDCCH candidate.

According to one aspect of the present disclosure, wherein when there exist L1 resource groups in the first resource set belonging to the first resource group subset and L1 is a positive integer greater than 1, indexes of the L1 resource groups in the first resource group subset are consecutive.

In one embodiment, advantages of the above method include that a precoding granularity of a PDCCH candidate in each resource group subset is maximized, thus optimizing performance of channel estimation.

According to one aspect of the present disclosure, wherein a second resource set is a resource set different from the first resource set in the K resource sets; a number of resource groups comprised in the second resource set is equal to the L; a number of resource group(s) belonging to the first resource group subset in the first resource set is not equal to a number of resource group(s) belonging to the first resource group subset in the second resource set.

In one embodiment, advantages of the above method include that a more flexible correspondence between a CCE and a spatial relation is allowed, which enhances flexibility in the design of search space set.

According to one aspect of the present disclosure, wherein the M resource group subsets respectively correspond to M reference values; an index of the first resource group in the first resource group subset is related to a first reference value, and the first reference value is a reference value corresponding to the first resource group subset in the M reference values.

According to one aspect of the present disclosure, wherein the M resource group subsets respectively belong to M resource group sets, and the first information block is used for respectively indicating the M resource group subsets out of the M resource group sets.

According to one aspect of the present disclosure, wherein the first node is a UE.

According to one aspect of the present disclosure, wherein the first node is a relay node.

The present disclosure provides a method in a second node for wireless communications, comprising:

transmitting a first information block; and transmitting a first signaling in a first resource pool;

herein, the first information block is used for determining the first resource pool; the first resource pool comprises K resource sets, K being a positive integer greater than 1; any of the K resource sets comprises a positive integer number of resource group(s), any resource group in the first resource pool belongs to one of M resource group subsets, M being a positive integer number greater than 1; a first resource set is one of the K resource sets, a first index is an index of the first resource set in a first resource sub-pool, and a number of resource group(s) comprised in the first resource set is equal to L0, L0 being a positive integer; the first resource sub-pool comprises K1 resource set(s) in the K resource sets, and a number of resource group(s) comprised in any resource set in the first resource sub-pool is equal to the L0, K1 being a positive integer not greater than the K; the first resource set comprises a first resource group, and a second index is an index of the first resource group in the first resource set; the first resource group belongs to a first resource group subset in the M resource group subsets, and the first resource group subset is related to at least one of the first index or the second index.

According to one aspect of the present disclosure, the method in a first node for wireless communications comprises:

transmitting a first signal;

herein, the first signaling comprises scheduling information of the first signal.

According to one aspect of the present disclosure, the method in a first node for wireless communications comprises:

receiving a first signal;

herein, the first signaling comprises scheduling information of the first signal.

According to one aspect of the present disclosure, wherein the M resource group subsets respectively correspond to M spatial relations, and the M spatial relations respectively indicate M reference signals.

According to one aspect of the present disclosure, wherein when the L0 is equal to L and the L is a positive integer not less than the M, the first resource set comprises L resource groups, for any given resource group subset in the M resource group subsets, there exists a resource group in the L resource groups belonging to the given resource group subset.

According to one aspect of the present disclosure, wherein when there exist L1 resource groups in the first resource set belonging to the first resource group subset and L1 is a positive integer greater than 1, indexes of the L1 resource groups in the first resource group subset are consecutive.

According to one aspect of the present disclosure, wherein a second resource set is a resource set different from the first resource set in the K resource sets; a number of resource groups comprised in the second resource set is equal to the L; a number of resource group(s) belonging to the first resource group subset in the first resource set is not equal to a number of resource group(s) belonging to the first resource group subset in the second resource set.

According to one aspect of the present disclosure, wherein the M resource group subsets respectively correspond to M reference values; an index of the first resource group in the first resource group subset is related to a first reference value, and the first reference value is a reference value corresponding to the first resource group subset in the M reference values.

According to one aspect of the present disclosure, wherein the M resource group subsets respectively belong to M resource group sets, and the first information block is used for respectively indicating the M resource group subsets out of the M resource group sets.

According to one aspect of the present disclosure, wherein the second node is a base station.

According to one aspect of the present disclosure, wherein the second node is a UE.

According to one aspect of the present disclosure, wherein the second node is a relay node.

The present disclosure provides a first node for wireless communication, comprising:

a first receiver, receiving a first information block; and a first receiver, monitoring a first-type signaling in a first resource pool;

herein, the first information block is used for determining the first resource pool; the first resource pool comprises K resource sets, K being a positive integer greater than 1; any of the K resource sets comprises a positive integer number of resource group(s), any resource group in the first resource pool belongs to one of M resource group subsets, M being a positive integer number greater than 1; a first resource set is one of the K resource sets, a first index is an index of the first resource set in a first resource sub-pool, and a number of resource group(s) comprised in the first resource set is equal to L0, L0 being a positive integer; the first resource sub-pool comprises K1 resource set(s) in the K resource sets, and a number of resource group(s) comprised in any resource set in the first resource sub-pool is equal to the L0, K1 being a positive integer not greater than the K; the first resource set comprises a first resource group, and a second index is an index of the first resource group in the first resource set; the first resource group belongs to a first resource group subset in the M resource group subsets, and the first resource group subset is related to at least one of the first index or the second index.

The present disclosure provides a second node for wireless communications, comprising:

a second processor, transmitting a first information block; and a first transmitter, transmitting a first signaling in a first resource block;

herein, the first information block is used for determining the first resource pool; the first resource pool comprises K resource sets, K being a positive integer greater than 1; any of the K resource sets comprises a positive integer number of resource group(s), any resource group in the first resource pool belongs to one of M resource group subsets, M being a positive integer number greater than 1; a first resource set is one of the K resource sets, a first index is an index of the first resource set in a first resource sub-pool, and a number of resource group(s) comprised in the first resource set is equal to L0, L0 being a positive integer; the first resource sub-pool comprises K1 resource set(s) in the K resource sets, and a number of resource group(s) comprised in any resource set in the first resource sub-pool is equal to the L0, K1 being a positive integer not greater than the K; the first resource set comprises a first resource group, and a second index is an index of the first resource group in the first resource set; the first resource group belongs to a first resource group subset in the M resource group subsets, and the first resource group subset is related to at least one of the first index or the second index.

In one embodiment, the present disclosure has the following advantages over conventional schemes:

Multi-TRP/panel transmission of physical layer control channels is realized, thus improving reliability of transmission of physical layer control channels.

Flexible and simple, it does not affect the design of CORESET and has a good backward compatibility.

The present disclosure provides a method in a first node for wireless communications, comprising:

receiving a first information block, the first information block being used for determining a first resource pool and M reference signals, M being a positive integer greater than 1;

receiving a first signaling in the first resource pool; and transmitting a first signal in a first radio resource block;

herein, the first signaling is used for determining the first radio resource block; the first resource pool comprises more than one resource group; the first signaling occupies a first resource set, the first resource set comprises a positive integer number of resource group(s), and any resource group in the first resource set belongs to the first resource pool; a reference signal transmitted in any resource group comprised in the first resource pool is spatially related to one of the M reference signals; a first resource group is a resource group in the first resource set, and a reference signal transmitted in the first resource group is spatially related to a first reference signal in the M reference signals; the first resource group is used for determining a first index, and the first index and the first reference signal are used together for determining the first radio resource block.

In one embodiment, a problem to be solved in the present disclosure includes: in a control channel based on multi-TRP/panel transmission, how to determine an Uplink physical layer control channel. The above method establishes a connection between the Uplink physical layer control channel and a transmitting beam of a scheduling signaling, thus solving the problem.

In one embodiment, characteristics of the above method include that the first resource pool is a search space set, the M reference signals respectively correspond to transmitting beams of different CCEs in the first resource pool; the first resource group is a CCE is the first resource pool, and a transmitting beam of the first resource group are used for determining the first radio resource block.

In one embodiment, advantages of the above method include that different CCEs in a same search radio set correspond to a same index for being transmitted by different beams is avoided, thus avoiding the incurred Uplink physical layer control channel conflicts and ensuring transmission reliability of the Uplink physical layer control channel.

In one embodiment, advantages of the above method include that extra signaling overhead is avoided to indicate Uplink physical layer control channel.

According to one aspect of the present disclosure, wherein any resource group in the first resource pool corresponds to a first-type value; a second resource group is any resource group in the first resource pool, and a reference signal transmitted in the second resource group is spatially related to a second reference signal in the M reference signals; a first value is a first-type value corresponding to the second resource group, and the first value is used for determining the second reference signal out of the M reference signals.

According to one aspect of the present disclosure, comprising:

receiving a second information block;

herein, the second information block is used for determining M resource group sets; the M resource group sets respectively correspond to the M reference signals, and any resource group in the first resource pool belongs to one of M resource group sets; the first resource group belongs to a first resource group set in the M resource group sets, and the first reference signal is a reference signal corresponding to the first resource group set in the M reference signals.

According to one aspect of the present disclosure, wherein the first signal carries a first bit block, a number of bits comprised in the first bit block is used for determining a first radio resource block set, and the first radio resource block belongs to the first radio resource block set; the first index and the first reference signal are used together for determining the first radio resource block out of the first radio resource block set.

According to one aspect of the present disclosure, wherein when the first resource set comprises K1 resource groups and K1 is a positive integer number greater than 1, the first resource group is a first resource group in the K1 resource groups.

According to one aspect of the present disclosure, comprising:

receiving a second signal;

herein, the first signaling indicates scheduling information of the second signal; the second signal carries a second bit block, and the first signal indicates whether the second bit block is correctly received.

According to one aspect of the present disclosure, wherein the first reference signal is used for determining a first parameter; the first index and the first parameter are used together for determining the first radio resource block.

According to one aspect of the present disclosure, wherein the first node is a UE.

According to one aspect of the present disclosure, wherein the first node is a relay node.

The present disclosure provides a method in a second node for wireless communications, comprising:

transmitting a first information block, the first information block being used for determining a first resource pool and M reference signals, M being a positive integer greater than 1;

transmitting a first signaling in the first resource pool; and receiving a first signal in a first radio resource block;

herein, the first signaling is used for determining the first radio resource block; the first resource pool comprises more than one resource group; the first signaling occupies a first resource set, the first resource set comprises a positive integer number of resource group(s), and any resource group in the first resource set belongs to the first resource pool; a reference signal transmitted in any resource group comprised in the first resource pool is spatially related to one of the M reference signals; a first resource group is a resource group in the first resource set, and a reference signal transmitted in the first resource group is spatially related to a first reference signal in the M reference signals; the first resource group is used for determining a first index, and the first index and the first reference signal are used together for determining the first radio resource block.

According to one aspect of the present disclosure, wherein any resource group in the first resource pool corresponds to a first-type value; a second resource group is any resource group in the first resource pool, and a reference signal transmitted in the second resource group is spatially related to a second reference signal in the M reference signals; a first value is a first-type value corresponding to the second resource group, and the first value is used for determining the second reference signal out of the M reference signals.

According to one aspect of the present disclosure, comprising:

transmitting a second information block;

herein, the second information block is used for determining M resource group sets; the M resource group sets respectively correspond to the M reference signals, and any resource group in the first resource pool belongs to one of M resource group sets; the first resource group belongs to a first resource group set in the M resource group sets, and the first reference signal is a reference signal corresponding to the first resource group set in the M reference signals.

According to one aspect of the present disclosure, wherein the first signal carries a first bit block, a number of bits comprised in the first bit block is used for determining a first radio resource block set, and the first radio resource block belongs to the first radio resource block set; the first index and the first reference signal are used together for determining the first radio resource block out of the first radio resource block set.

According to one aspect of the present disclosure, wherein when the first resource set comprises K1 resource groups and K1 is a positive integer number greater than 1, the first resource group is a first resource group in the K1 resource groups.

According to one aspect of the present disclosure, comprising:

transmitting a second signal;

herein, the first signaling indicates scheduling information of the second signal; the second signal carries a second bit block, and the first signal indicates whether the second bit block is correctly received.

According to one aspect of the present disclosure, wherein the first reference signal is used for determining a first parameter; the first index and the first parameter are used together for determining the first radio resource block.

According to one aspect of the present disclosure, wherein the second node is a base station.

According to one aspect of the present disclosure, wherein the second node is a UE.

According to one aspect of the present disclosure, wherein the second node is a relay node.

The present disclosure provides a first node for wireless communication, comprising:

a first receiver, receiving a first information block, the first information block being used for determining a first resource pool and M reference signals, M being a positive integer greater than 1;

the first receiver receiving a first signaling in the first resource pool; and a first transmitter, transmitting a first signal in a first radio resource block;

herein, the first signaling is used for determining the first radio resource block; the first resource pool comprises more than one resource group; the first signaling occupies a first resource set, the first resource set comprises a positive integer number of resource group(s), and any resource group in the first resource set belongs to the first resource pool; a reference signal transmitted in any resource group comprised in the first resource pool is spatially related to one of the M reference signals; a first resource group is a resource group in the first resource set, and a reference signal transmitted in the first resource group is spatially related to a first reference signal in the M reference signals; the first resource group is used for determining a first index, and the first index and the first reference signal are used together for determining the first radio resource block.

The present disclosure provides a second node for wireless communications, comprising:

a second transmitter, transmitting a first information block, the first information block being used for determining a first resource pool and M reference signals, M being a positive integer greater than 1;

the second transmitter transmitting a first signaling in the first resource pool; and a second receiver, receiving a signal in a first radio resource block;

herein, the first signaling is used for determining the first radio resource block; the first resource pool comprises more than one resource group; the first signaling occupies a first resource set, the first resource set comprises a positive integer number of resource group(s), and any resource group in the first resource set belongs to the first resource pool; a reference signal transmitted in any resource group comprised in the first resource pool is spatially related to one of the M reference signals; a first resource group is a resource group in the first resource set, and a reference signal transmitted in the first resource group is spatially related to a first reference signal in the M reference signals; the first resource group is used for determining a first index, and the first index and the first reference signal are used together for determining the first radio resource block.

In one embodiment, the present disclosure has the following advantages over conventional schemes:

in the control channel based on multi-TRP/panel transmission, different CCEs in a same search radio set corresponding to a same CCE index for being transmitted by different beams is avoided, thus avoiding the incurred Uplink physical layer control channel conflicts and ensuring transmission reliability of the physical layer control channel.

extra signaling overhead is avoided to indicate the Uplink physical layer control channel.

BRIEF DESCRIPTION OF THE DRAWINGS

Other features, objects and advantages of the present disclosure will become more apparent from the detailed description of non-restrictive embodiments taken in conjunction with the following drawings:

FIG. 5 illustrates a flowchart of wireless communications according to one embodiment of the present disclosure.

FIG. 6 illustrate a schematic diagram of a first resource group subset being related to at least one of a first index or a second index according to one embodiment of the present disclosure.

FIG. 7 illustrates a schematic diagram of M resource group subsets and M spatial relations according to one embodiment of the present disclosure.

FIG. 8 illustrates a schematic diagram of relations among L resource groups and M resource group subsets according to one embodiment of the present disclosure.

FIG. 9 illustrates a schematic diagram of L1 resource groups in a first resource group subset according to one embodiment of the present disclosure.

FIG. 10 illustrates a schematic diagram of a first resource set and a second resource set according to one embodiment of the present disclosure.

FIG. 11 illustrates a schematic diagram of M resource group subsets and M reference values according to one embodiment of the present disclosure.

FIG. 12 is a schematic diagram of an index of a first resource group in a first resource group subset according to one embodiment of the present disclosure.

FIG. 13 is a schematic diagram of an index of a first resource group according to one embodiment of the present disclosure.

FIG. 18 illustrates a flowchart of wireless communications according to one embodiment of the present disclosure.

FIG. 19 illustrates a schematic diagram of a first information block according to one embodiment of the present disclosure.

FIG. 20 illustrates a schematic diagram of a first given reference signal being spatially related to a second given reference signal according to one embodiment of the present disclosure.

FIG. 21 illustrates a schematic diagram of a second resource group, a second reference signal and a first value according to one embodiment of the present disclosure.

FIG. 22 illustrates a schematic diagram of a second resource group, a second reference signal and a first value according to one embodiment of the present disclosure.

FIG. 23 illustrates a schematic diagram of a second information block according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
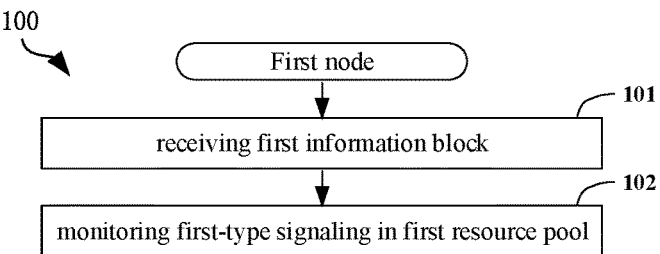
FIG. 1 illustrates a flowchart of a first information block and a first-type signaling according to one embodiment of the present disclosure.

Embodiment 1 illustrates a flowchart of a first information block and a first-type signaling according to one embodiment of the present disclosure, as shown in FIG. 1. In step 100 illustrated by FIG. 1, each box represents a step. Particularly, the sequential order of steps in these boxes does not necessarily mean that the steps are chronologically arranged.

In Embodiment 1, the first node in the present disclosure receives a first information block in step 101; and in step 102, monitors a first-type signaling in a first resource pool; herein, the first information block is used for determining the first resource pool; the first resource pool comprises K resource sets, K being a positive integer greater than 1; any of the K resource sets comprises a positive integer number of resource group(s), any resource group in the first resource pool belongs to one of M resource group subsets, M being a positive integer number greater than 1; a first resource set is one of the K resource sets, a first index is an index of the first resource set in a first resource sub-pool, and a number of resource group(s) comprised in the first resource set is equal to L0, L0 being a positive integer; the first resource sub-pool comprises K1 resource set(s) in the K resource sets, and a number of resource group(s) comprised in any resource set in the first resource sub-pool is equal to the L0, K1 being a positive integer not greater than the K; the first resource set comprises a first resource group, and a second index is an index of the first resource group in the first resource set; the first resource group belongs to a first resource group subset in the M resource group subsets, and the first resource group subset is related to at least one of the first index or the second index.

In one embodiment, the first information block is carried by a higher-layer signaling.

In one embodiment, the first information block is carried by a Radio Resource Control (RRC) signaling.

In one embodiment, the first information block is carried by a Medium Access Control Layer Control Element (MAC CE) signaling.

In one embodiment, the first information block is transmitted on a Downlink.

In one embodiment, the first information block is transmitted on a Sidelink.

In one embodiment, the first information block comprises a positive integer number of information bit(s).

In one embodiment, the first information block comprises information in all or partial fields in an Information Element (IE).

In one embodiment, the first information block comprises information in all or partial fields in a ControlResourceSet IE.

In one embodiment, the first information block comprises information in all or partial fields in a SearchSpace IE.

In one embodiment, the first information block indicates the first resource pool.

In one embodiment, the first information block explicitly indicates the first resource pool.

In one embodiment, the first information block implicitly indicates the first resource pool.

In one embodiment, the first information block indicates configuration information of the first resource pool.

In one embodiment, the configuration information of the first resource pool includes one or more of occupied time-domain resources, occupied frequency-domain resources, occupied code-domain resources, a DeModulation Reference Signal (DMRS) scrambling sequence, a CCE to Resource Element Group (REG) mapping type, a CCE aggregation level, a PDCCH candidate number, a SearchSpace Type or a PDCCH format.

In one embodiment, the first information block is used for determining the M resource group subsets.

In one embodiment, the first information block indicates the M resource group subsets.

In one embodiment, the first information block explicitly indicates the M resource group subsets.

In one embodiment, the first information block implicitly indicates the M resource group subsets.

In one embodiment, the first-type signaling comprises a layer 1 (L1) signaling.

In one embodiment, the first-type signaling comprises a control signaling.

In one embodiment, the first-type signaling comprises a L1 control signaling.

In one embodiment, the first-type signaling comprises a dynamic signaling.

In one embodiment, the first-type signaling comprises a higher-layer signaling.

In one embodiment, the first-type signaling comprises a MAC CE signaling.

In one embodiment, the first-type signaling comprises Downlink control information (DCI).

In one embodiment, the first-type signaling comprises one or more fields in a piece of DCI.

In one embodiment, the first-type signaling comprises DCI for DownLink Grant.

In one embodiment, the first-type signaling comprises DCI for UpLink Grant.

In one embodiment, a signaling format of the first-type signaling includes one or more of DCI format 0_0, DCI format 0_1, DCI format 0_2, DCI format 1_0, DCI format 1_1, DCI format 1_2, DCI format 2_0, DCI format 2_1, DCI format 2_2, DCI format 2_3, DCI format 2_4, DCI format 2_5 and DCI format 2_6.

In one embodiment, the monitoring refers to blind decoding, that is, a signal is received and decoding operation is performed; if the decoding is determined to be correct according to a Cyclic Redundancy Check (CRC) bit, the first-type signaling is judged to be received; otherwise, the first-type signaling is judged not to be received.

In one embodiment, the monitoring refers to a coherent detection-based reception, that is, coherent reception is performed and energy of a signal acquired after the coherent reception is measured; if the energy of the signal acquired after the coherent reception is greater than a first given threshold, the first-type signaling is judged to be received; otherwise, the first-type signaling is judged not to be received.

In one embodiment, the monitoring refers to an energy detection-based reception, that is, energy of a radio signal is sensed and is averaged to acquire received energy; if the received energy is greater than a second given threshold, the first-type signaling is judged to be received; otherwise, the first-type signaling is judged not to be received.

In one embodiment, the phrase monitoring a first-type signaling in a first resource pool means that the first node determines whether the first-type signaling is transmitted in the first resource pool according to a CRC.

In one embodiment, the phrase monitoring a first-type signaling in a first resource pool means that the first node determines whether the first-type signaling is transmitted in the first resource pool according to a coherent detection.

In one embodiment, the phrase monitoring a first-type signaling in a first resource pool means that the first node determines whether the first-type signaling is transmitted in the first resource pool according to an energy detection.

In one embodiment, the first node monitors the first-type signaling in each resource set in the first resource pool.

In one embodiment, the first node monitors the first-type signaling in only part of resource sets in the first resource pool.

In one embodiment, the first resource pool comprises a COntrol REsource SET (CORESET).

In one embodiment, the first resource pool comprises a search space.

In one embodiment, the first resource pool comprises a search space set.

In one embodiment, the first resource pool is a CORESET.

In one embodiment, the first resource pool comprises is a search space.

In one embodiment, the first resource pool is a search space set.

In one embodiment, the first resource pool corresponds to a ControlResourceSetId.

In one embodiment, the first resource pool corresponds to a SearchSpaceId.

In one embodiment, the first resource pool is an occurrence of a search space set in time domain.

In one embodiment, the first resource pool is an occurrence of a search space set in a PDCCH monitoring occasion.

In one embodiment, the first resource pool consists of the K resource sets.

In one embodiment, the first resource pool comprises a positive integer number of PDCCH candidate(s).

In one embodiment, the first resource pool comprises a positive integer number of PDCCH candidate(s) in a same PDCCH monitoring occasion.

In one embodiment, the first resource pool consists of all PDCCH candidate(s) in a same PDCCH monitoring occasion.

In one embodiment, the first resource pool comprises time-domain resources.

In one embodiment, the first resource pool comprises frequency-domain resources.

In one embodiment, the first resource pool comprises code-domain resources.

In one embodiment, the first resource pool occupies a positive integer number of Resource Element(s)(RE(s)) in the time-frequency domain.

In one embodiment, an RE occupies a multicarrier symbol in time domain, and a subcarrier in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the first resource pool occupies a positive integer number of sub-carrier(s) in frequency domain.

In one embodiment, the first resource pool occupies a positive integer number of Physical resource block(s) (PRB(s)) in frequency domain.

In one embodiment, the first resource pool occupies a positive integer number of consecutive PRBs in frequency domain.

In one embodiment, the first resource pool occupies a positive integer number of inconsecutive PRBs in frequency domain.

In one embodiment, the first resource pool occupies a positive integer number of multi-carrier symbol(s) in time domain.

In one embodiment, the first resource pool occupies a positive integer number of consecutive multi-carrier symbols in time domain.

In one embodiment, the first resource pool occupies a positive integer number of inconsecutive multi-carrier symbols in time domain.

In one embodiment, the first resource pool occupies a positive integer number of slot(s) in time domain.

In one embodiment, the first resource pool occurs multiple times in time domain.

In one embodiment, an occurrence of the first resource pool in time domain is a PDCCH monitoring occasion.

In one embodiment, the first resource pool occurs periodically in time domain.

In one embodiment, the first resource pool occurs only once in time domain.

In one embodiment, the K resource sets comprises PDCCH candidates.

In one embodiment, any of the K resource sets comprises a PDCCH candidate.

In one embodiment, any of the K resource sets is a PDCCH candidate.

In one embodiment, the K resource sets comprises CCEs.

In one embodiment, any of the K resource sets comprises a CCE.

In one embodiment, the K resource sets comprises REGs.

In one embodiment, any of the K resource sets comprises an REG.

In one embodiment, any of the K resource sets occupies a positive integer number of RE(s) in time-frequency domain.

In one embodiment, any of the K resource sets occupies a positive integer number of PRB(s) in frequency domain.

In one embodiment, any of the K resource sets occupies a positive integer number of multicarrier symbol(s) in time domain.

In one embodiment, there exist numbers of REs occupied by two of the K resource sets being the same.

In one embodiment, there exist numbers of REs occupied by two of the K resource sets being different.

In one embodiment, there exist numbers of PRBs occupied by two of the K resource sets being the same.

In one embodiment, there exist numbers of PRBs occupied by two of the K resource sets being different.

In one embodiment, there exist numbers of multicarrier symbols occupied by two of the K resource sets being the same.

In one embodiment, numbers of multicarrier symbols occupied by any two of the K resource sets being the same.

In one embodiment, there exist numbers of multicarrier symbols occupied by two of the K resource sets being different.

In one embodiment, any of the K resource sets consists of a positive integer number of resource group(s).

In one embodiment, for any given resource set in the K resource sets, a number of resource groups comprised in the given resource set is a CCE aggregation level corresponding to the given resource set.

In one embodiment, there exists a number of resource group comprised in one of the K resource sets being equal to 1.

In one embodiment, there exists a number of resource groups comprised in one of the K resource sets being greater than 1.

In one embodiment, there exist numbers of resource groups comprised in two of the K resource sets being the same.

In one embodiment, there exist numbers of resource groups comprised in two of the K resource sets being different.

In one embodiment, a number of resource group(s) comprised in any of the K resource sets is one of 1, 2, 8 or 16.

In one embodiment, a resource group in the first resource pool comprises CCEs.

In one embodiment, any resource group in the first resource pool is a CCE.

In one embodiment, a resource group in the first resource pool comprises REGs.

In one embodiment, any resource group in the first resource pool is an REG.

In one embodiment, any resource group in the first resource pool comprises a positive integer number of REG(s).

In one embodiment, any resource group in the first resource pool comprises 6 REGs.

In one embodiment, any resource group in the first resource pool occupies a positive integer number of RE(s) in time-frequency domain.

In one embodiment, any resource group in the first resource pool occupies a positive integer number of PRB(s) in frequency domain.

In one embodiment, any resource group in the first resource pool occupies a positive integer number of consecutive PRBs in frequency domain.

In one embodiment, any resource group in the first resource pool occupies a positive integer number of inconsecutive PRBs in frequency domain.

In one embodiment, any resource group in the first resource pool occupies a positive integer number of multicarrier symbol(s) in time domain.

In one embodiment, any resource group in the first resource pool occupies a positive integer number of consecutive multicarrier symbols in time domain.

In one embodiment, numbers of REs occupied by any two resource groups in the first resource pool in time-frequency domain being equal.

In one embodiment, any resource group in the first resource pool occupies 72 REs in time-frequency domain.

In one embodiment, part of REs occupied by any resource group in the first resource pool are reserved for a DMRS.

In one embodiment, the M is equal to 2.

In one embodiment, the M is greater than 2.

In one embodiment, any resource group in the first resource pool belongs to one of M resource group subsets.

In one embodiment, any resource group subset in the M resource group subsets comprises a positive integer number of resource group(s).

In one embodiment, any resource group subset in the M resource group subsets comprises a positive integer number of CCE(s).

In one embodiment, any resource group in the M resource group subsets is a CCE.

In one embodiment, any resource group in the M resource group subsets is an REG.

In one embodiment, any resource group in the M resource group subsets belongs to a CORESET.

In one embodiment, the M resource group subsets respectively belong to M CORESETs, and the M CORESETs respectively correspond to the M spatial relations.

In one embodiment, any of the M resource group subsets belongs to a search space set.

In one embodiment, any two of the M resource group subsets occupy mutually-orthogonal frequency-domain resources.

In one embodiment, any two of the M resource group subsets occupy same frequency-domain resources.

In one embodiment, any two of the M resource group subsets occupy same time-domain resources.

In one embodiment, any two of the M resource group subsets occupy same time-frequency resources.

In one embodiment, a reference first resource group and a reference second resource group are any two resource groups belonging to two different resource group subsets in the M resource group subsets in the first resource pool.

In one subembodiment of the above embodiment, a radio signal transmitted in the reference first resource group and a radio signal transmitted in the reference second resource group cannot be assumed to be Quasi Co-Located (QCL).

In one subembodiment of the above embodiment, a radio signal transmitted in the reference first resource group and a radio signal transmitted in the reference second resource group cannot be assumed to be QCLed with a corresponding QCL type of QCL-TypeD.

In one embodiment, the M resource group subsets correspond to same CCE-to-REG mapping.

In one embodiment, the M resource group subsets correspond to a same Precoder Granularity.

In one embodiment, the M resource group subsets respectively correspond to M different ControlResourceSetIds.

In one embodiment, the M resource group subsets respectively correspond to M different Se arch Space IDs.

In one embodiment, the M resource group subsets respectively correspond to M different TCI-StateIds.

In one embodiment, the M resource group subsets belong to a same Carrier in frequency domain.

In one embodiment, the M resource group subsets belong to a same serving cell.

In one embodiment, the M resource group subsets belong to a same BandWidth Part (BWP) in frequency domain.

In one embodiment, any two resource groups in any of the M resource group subsets occupy mutually-orthogonal time-frequency resources.

In one embodiment, any two resource groups in any of the M resource group subsets occupy mutually-orthogonal frequency-domain resources and same time-domain resources.

In one embodiment, any two resource groups in any of the M resource group subsets occupy same time-frequency resources and different DMRS ports.

In one embodiment, there exist two resource groups comprised in one of the K resource sets respectively belonging to two different resource group subsets in the M resource group subsets.

In one embodiment, there exist M resource groups comprised in one of the K resource sets respectively belonging to the M resource group subsets.

In one embodiment, there exist all resource groups comprised in one of the K resource sets belonging to one of the M resource group subsets.

In one embodiment, the first resource set is one of the K resource sets.

In one embodiment, the first resource set is any of the K resource sets.

In one embodiment, the first resource set is any of the K resource sets in which a number of comprised resource group is equal to 1.

In one embodiment, the first resource set is any of the K resource sets in which a number of comprised resource groups is greater than 1.

In one embodiment, the first resource set is a resource set in the first resource sub-pool.

In one embodiment, the first resource set is any resource set in the first resource sub-pool.

In one embodiment, the first resource set is a PDCCH candidate.

In one embodiment, the first resource set is an occurrence of a PDCCH candidate in time domain.

In one embodiment, the first resource set is an occurrence of a PDCCH candidate in a PDCCH monitoring occasion.

In one embodiment, the first resource sub-pool consists of all resource sets in which numbers of comprised resource groups are equal to the L0 in the K resource sets.

In one embodiment, the first resource sub-pool consists of all resource sets whose CCE aggregation levels are equal to the L0 in the K resource sets.

In one embodiment, the K1 is equal to 1.

In one embodiment, the K1 is greater than 1.

In one embodiment, the K1 is equal to the K.

In one embodiment, the K1 is less than the K.

In one embodiment, the L0 is equal to 1.

In one embodiment, the L0 is greater than 1.

In one embodiment, the first resource group is a resource group comprised in the first resource set.

In one embodiment, the first resource group is any resource group comprised in the first resource set.

In one embodiment, the first resource group is a CCE.

In one embodiment, the first resource group is an REG.

Embodiment 2

Figure 2:
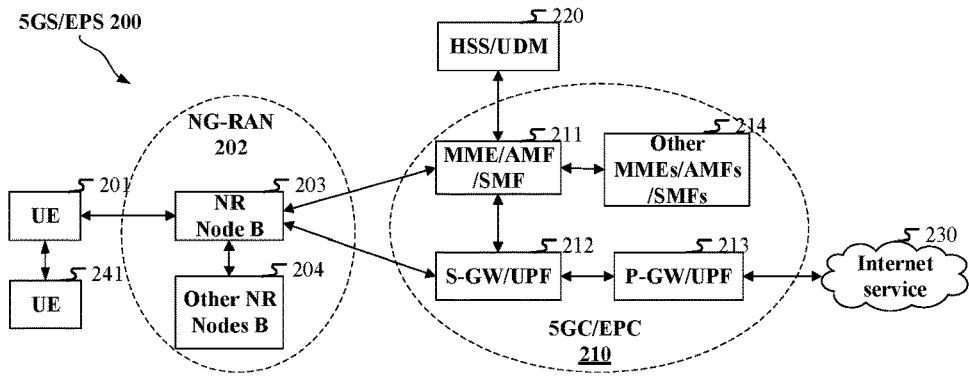
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2.

FIG. 2 is a diagram illustrating a network architecture 200 of Long-Term Evolution (LTE), Long-Term Evolution Advanced (LTE-A) and future 5G systems. The LTE, LTE-A and future 5G systems network architecture 200 may be called an Evolved Packet System (EPS) 200. The 5G NR or LTE network architecture 200 may be called a 5G System (5GS)/Evolved Packet System (EPS) 200 or other appropriate terms. The 5GS/EPS 200 may comprise one or more UEs 201, a UE 241 that is in Sidelink communications with a UE 201, an NG-RAN 202, a 5G-Core Network/Evolved Packet Core (5GC/EPC) 210, a Home Subscriber Server (HSS)/ Unified Data Management (UDM) 220 and an Internet Service 230. The 5GS/EPS 200 may be interconnected with other access networks. For simple description, the entities/ interfaces are not shown. As shown in FIG. 2, the 5GS/EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, wearable devices, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/ UPF 212, the S-GW/UPF 212 is connected to the P-GW/ UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present disclosure comprises the UE 201.

In one embodiment, the first node in the present disclosure comprises the UE 241.

In one embodiment, the second node in the present disclosure comprises the gNB 203.

In one embodiment, the second node in the present disclosure comprises the UE 241.

In one embodiment, a radio link between the UE 201 and the gNB 203 is a cellular network link.

In one embodiment, a radio link between the UE 201 and the UE 241 is a Sidelink.

In one embodiment, a transmitter of the first information block in the present disclosure comprises the gNB 203.

In one embodiment, a receiver of the first information block in the present disclosure comprises the UE 201.

In one embodiment, a transmitter of the first-type signaling in the present disclosure comprises the gNB 203.

In one embodiment, a receiver of the first-type signaling in the present disclosure comprises the UE 201.

In one embodiment, a transmitter of the first signaling in the present disclosure comprises the gNB 203.

In one embodiment, a receiver of the first signaling in the present disclosure comprises the UE 201.

In one embodiment, a transmitter of the first signal in the present disclosure comprises the UE 201.

In one embodiment, a receiver of the first signal in the present disclosure comprises the gNB 203.

Embodiment 3

Figure 3:
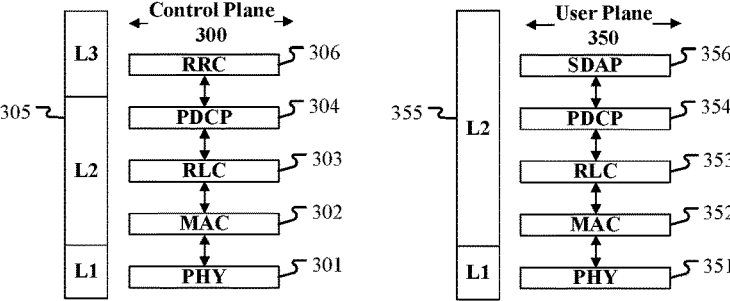
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to one embodiment of the present disclosure, as shown in FIG. 3.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, a RSU in gNB or V2X) and a second communication node (gNB, a RSU in UE or V2X), or between two UEs is represented by three layers, which are a layer 1, a layer 2 and a layer 3, respectively. The L1 is the lowest layer and performs signal processing functions of various PHY layers. The L1 is called PHY 301 in the present disclosure. The layer 2 (L2) 305 is above the PHY 301 and is in charge of a link between a first communication node and a second communication node, or between two UEs. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The RRC sublayer 306 in layer 3(L3) of the control plane 300 is responsible for acquiring radio resources (i.e., radio bearer) and configuring the lower layer with an RRC signaling between a second communication node and a first communication node device. The radio protocol architecture of the user plane 350 comprises L1 and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information block is generated by the RRC sublayer 306.

In one embodiment, the first information block is generated by the MAC sublayer 302 or the MAC sublayer 352.

In one embodiment, the first-type signaling is generated by the PHY 301 or the PHY 351.

In one embodiment, the first-type signaling is generated by the MAC sublayer 302 or the MAC sublayer 352.

In one embodiment, one part of the first information block is generated by the RRC sublayer 306, and the other part of the first information block is generated by the MAC sublayer 302 or the MAC sublayer 352.

In one embodiment, the first signaling is generated by the PHY 301 or the PHY 351.

In one embodiment, the first signaling is generated by the MAC sublayer 302 or the MAC sublayer 352.

In one embodiment, the first signal is generated by the PHY 301 or the PHY 351.

Embodiment 4

Figure 4:
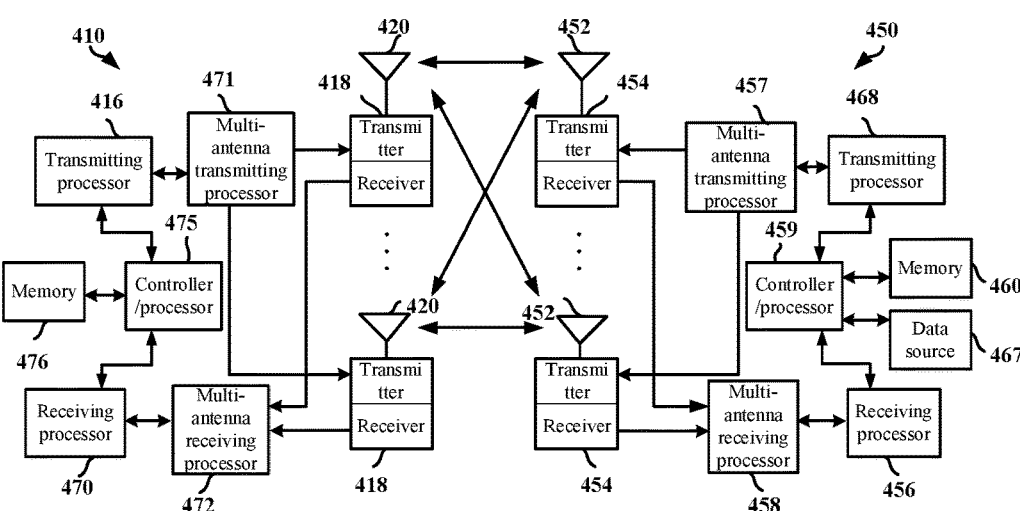
FIG. 4 illustrates a schematic diagram of a first communication device and a second communication device according to one embodiment of the present disclosure.

Embodiment 4 illustrates a schematic diagram of a first communication device and a second communication device according to one embodiment of the present disclosure, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the second communication device 450 based on various priorities. The controller/processor 475 is also in charge of HARQ operation, retransmission of a lost packet, and a signaling to the second communication node 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more parallel streams. The transmitting processor 416 then maps each parallel stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In downlink (DL) transmission, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL transmission, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for HARQ operation, retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. the controller/processor 475 provides de-multiplexing between a transport channel and a logical channel, packet reassembling, decryption, header decompression, control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives the first information block in the present disclosure; and monitors the first-type signaling in the present disclosure in the first resource pool in the present disclosure. The first information block is used for determining the first resource pool; the first resource pool comprises K resource sets, K being a positive integer greater than 1; any of the K resource sets comprises a positive integer number of resource group(s), any resource group in the first resource pool belongs to one of M resource group subsets, M being a positive integer number greater than 1; a first resource set is one of the K resource sets, a first index is an index of the first resource set in a first resource sub-pool, and a number of resource group(s) comprised in the first resource set is equal to L0, L0 being a positive integer; the first resource sub-pool comprises K1 resource set(s) in the K resource sets, and a number of resource group(s) comprised in any resource set in the first resource sub-pool is equal to the L0, K1 being a positive integer not greater than the K; the first resource set comprises a first resource group, and a second index is an index of the first resource group in the first resource set; the first resource group belongs to a first resource group subset in the M resource group subsets, and the first resource group subset is related to at least one of the first index or the second index.

In one embodiment, the second communication device 450 comprises a memory that stores a computer readable instruction program. The computer readable instruction program generates an action when executed by at least one processor. The action includes: receiving the first information block in the present disclosure; and monitoring the first-type signaling in the present disclosure in the first resource pool in the present disclosure. The first information block is used for determining the first resource pool; the first resource pool comprises K resource sets, K being a positive integer greater than 1; any of the K resource sets comprises a positive integer number of resource group(s), any resource group in the first resource pool belongs to one of M resource group subsets, M being a positive integer number greater than 1; a first resource set is one of the K resource sets, a first index is an index of the first resource set in a first resource sub-pool, and a number of resource group(s) comprised in the first resource set is equal to L0, L0 being a positive integer; the first resource sub-pool comprises K1 resource set(s) in the K resource sets, and a number of resource group(s) comprised in any resource set in the first resource sub-pool is equal to the L0, K1 being a positive integer not greater than the K; the first resource set comprises a first resource group, and a second index is an index of the first resource group in the first resource set; the first resource group belongs to a first resource group subset in the M resource group subsets, and the first resource group subset is related to at least one of the first index or the second index.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits the first information block in the present disclosure; and transmits the first signaling in the present disclosure in the first resource pool in the present disclosure. The first information block is used for determining the first resource pool; the first resource pool comprises K resource sets, K being a positive integer greater than 1; any of the K resource sets comprises a positive integer number of resource group(s), any resource group in the first resource pool belongs to one of M resource group subsets, M being a positive integer number greater than 1; a first resource set is one of the K resource sets, a first index is an index of the first resource set in a first resource sub-pool, and a number of resource group(s) comprised in the first resource set is equal to L0, L0 being a positive integer; the first resource sub-pool comprises K1 resource set(s) in the K resource sets, and a number of resource group(s) comprised in any resource set in the first resource sub-pool is equal to the L0, K1 being a positive integer not greater than the K; the first resource set comprises a first resource group, and a second index is an index of the first resource group in the first resource set; the first resource group belongs to a first resource group subset in the M resource group subsets, and the first resource group subset is related to at least one of the first index or the second index.

In one embodiment, the first communication device 410 comprises a memory that stores a computer readable instruction program. The computer readable instruction program generates an action when executed by at least one processor. The action includes: transmitting the first information block in the present disclosure; and transmitting the first signaling in the present disclosure in the first resource pool in the present disclosure. The first information block is used for determining the first resource pool; the first resource pool comprises K resource sets, K being a positive integer greater than 1; any of the K resource sets comprises a positive integer number of resource group(s), any resource group in the first resource pool belongs to one of M resource group subsets, M being a positive integer number greater than 1; a first resource set is one of the K resource sets, a first index is an index of the first resource set in a first resource sub-pool, and a number of resource group(s) comprised in the first resource set is equal to L0, L0 being a positive integer; the first resource sub-pool comprises K1 resource set(s) in the K resource sets, and a number of resource group(s) comprised in any resource set in the first resource sub-pool is equal to the L0, K1 being a positive integer not greater than the K; the first resource set comprises a first resource group, and a second index is an index of the first resource group in the first resource set; the first resource group belongs to a first resource group subset in the M resource group subsets, and the first resource group subset is related to at least one of the first index or the second index.

In one embodiment, the first node comprises the second communication device 450 in the present disclosure.

In one embodiment, the second node in the present disclosure comprises the first communication device 410.

In one embodiment, at least one of the antenna 452, the receiver 454, the receiving processor 456, the multi-antenna receiving processor 458, the controller/processor 459, the memory 460, or the data source 467 is used to receive the first information block in the present disclosure; and at least one of the antenna 420, the transmitter 418, the transmitting processor 416, the multi-antenna transmitting processor 471, the controller/processor 475, or the memory 476 is used to transmit the first information block in the present disclosure.

In one embodiment, at least one of the antenna 452, the receiver 454, the receiving processor 456, the multi-antenna receiving processor 458, the controller/processor 459, the memory 460, or the data source 467 is used to monitor the first-type signaling in the present disclosure in the first resource pool in the present disclosure; and at least one of the antenna 420, the transmitter 418, the transmitting processor 416, the multi-antenna transmitting processor 471, the controller/processor 475, or the memory 476 is used to transmit the first signaling in the present disclosure in the first resource pool in the present disclosure.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives the first information block; receives the first signaling in the first resource pool; and transmits the first signal in the first radio resource block. Herein, the first information block is used for determining the first resource pool and M reference signals, M being a positive integer greater than 1; the first signaling is used for determining the first radio resource block; the first resource pool comprises more than one resource group; the first signaling occupies a first resource set, the first resource set comprises a positive integer number of resource group(s), and any resource group in the first resource set belongs to the first resource pool; a reference signal transmitted in any resource group comprised in the first resource pool is spatially related to one of the M reference signals; a first resource group is a resource group in the first resource set, and a reference signal transmitted in the first resource group is spatially related to a first reference signal in the M reference signals; the first resource group is used for determining a first index, and the first index and the first reference signal are used together for determining the first radio resource block.

In one embodiment, the second communication device 450 comprises a memory that stores a computer readable instruction program. The computer readable instruction program generates an action when executed by at least one processor. The action includes: receiving the first information block; receiving the first signaling in the first resource pool; and transmitting the first signal in the first radio resource block. Herein, the first information block is used for determining the first resource pool and M reference signals, M being a positive integer greater than 1; the first signaling is used for determining the first radio resource block; the first resource pool comprises more than one resource group; the first signaling occupies a first resource set, the first resource set comprises a positive integer number of resource group(s), and any resource group in the first resource set belongs to the first resource pool; a reference signal transmitted in any resource group comprised in the first resource pool is spatially related to one of the M reference signals; a first resource group is a resource group in the first resource set, and a reference signal transmitted in the first resource group is spatially related to a first reference signal in the M reference signals; the first resource group is used for determining a first index, and the first index and the first reference signal are used together for determining the first radio resource block.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits the first information block; transmits the first signaling in the first resource pool; and receives the first signal in the first radio resource block. Herein, the first information block is used for determining the first resource pool and M reference signals, M being a positive integer greater than 1; the first signaling is used for determining the first radio resource block; the first resource pool comprises more than one resource group; the first signaling occupies a first resource set, the first resource set comprises a positive integer number of resource group(s), and any resource group in the first resource set belongs to the first resource pool; a reference signal transmitted in any resource group comprised in the first resource pool is spatially related to one of the M reference signals; a first resource group is a resource group in the first resource set, and a reference signal transmitted in the first resource group is spatially related to a first reference signal in the M reference signals; the first resource group is used for determining a first index, and the first index and the first reference signal are used together for determining the first radio resource block.

In one embodiment, the first communication device 410 comprises a memory that stores a computer readable instruction program. The computer readable instruction program generates an action when executed by at least one processor. The action includes: transmitting the first information block; transmitting the first signaling in the first resource pool; and receiving the first signal in the first radio resource block. Herein, the first information block is used for determining the first resource pool and M reference signals, M being a positive integer greater than 1; the first signaling is used for determining the first radio resource block; the first resource pool comprises more than one resource group; the first signaling occupies a first resource set, the first resource set comprises a positive integer number of resource group(s), and any resource group in the first resource set belongs to the first resource pool; a reference signal transmitted in any resource group comprised in the first resource pool is spatially related to one of the M reference signals; a first resource group is a resource group in the first resource set, and a reference signal transmitted in the first resource group is spatially related to a first reference signal in the M reference signals; the first resource group is used for determining a first index, and the first index and the first reference signal are used together for determining the first radio resource block.

In one embodiment, at least one of the antenna 452, the receiver 454, the receiving processor 456, the multi-antenna receiving processor 458, the controller/processor 459, the memory 460, or the data source 467 is used to receive the first signaling in the first resource pool in the present disclosure; and at least one of the antenna 420, the transmitter 418, the transmitting processor 416, the multi-antenna transmitting processor 471, the controller/processor 475, or the memory 476 is used to transmit the first signaling in the first resource pool in the present disclosure.

In one embodiment, at least one of the antenna 420, the receiver 418, the receiving processor 470, the multi-antenna receiving processor 472, the controller/processor 475, or the memory 476 is used to receive the first signal in the first radio resource block in the present disclosure; and at least one of the antenna 452, the transmitter 454, the transmitting processor 468, the multi-antenna transmitting processor 457, the controller/processor 459, the memory 460, or the data source 467 is used to transmit the first signal in the first radio resource in the present disclosure.

In one embodiment, at least one of the antenna 452, the receiver 454, the receiving processor 456, the multi-antenna receiving processor 458, the controller/processor 459, the memory 460, or the data source 467 is used to receive the second information block in the present disclosure; and at least one of the antenna 420, the transmitter 418, the transmitting processor 416, the multi-antenna transmitting processor 471, the controller/processor 475, or the memory 476 is used to transmit the second information block.

In one embodiment, at least one of the antenna 452, the receiver 454, the receiving processor 456, the multi-antenna receiving processor 458, the controller/processor 459, the memory 460, or the data source 467 is used to receive the second signal; and at least one of the antenna 420, the transmitter 418, the transmitting processor 416, the multi-antenna transmitting processor 471, the controller/processor 475, or the memory 476 is used to transmit the second signal.

Embodiment 5

Embodiment 5 illustrates a flowchart of wireless communications according to one embodiment in the present disclosure, as shown in FIG. 5. In FIG. 5, a second node U1 and a first node U2 are communication nodes transmitted via an air interface. In FIG. 5, steps in boxes F51 and F52 are respectively optional, and steps in boxes F51 and F52 are in an alternative relation.

The second node U1 transmits a first information block in step S511; transmits a first signaling in a first resource pool in step S512; transmits a first signal in step S5101; and receives a first signal in step S5102.

The first node U2 receives a first information block in step S521; in step 522, monitors a first-type signaling in a first resource pool; receives a first signal in step S5201; and transmits a first signal in step S5202.

In Embodiment 5, the first signaling is the first-type signaling; the first information block is used by the first node U2 for determining the first resource pool; the first resource pool comprises K resource sets, K being a positive integer greater than 1; any of the K resource sets comprises a positive integer number of resource group(s), any resource group in the first resource pool belongs to one of M resource group subsets, M being a positive integer number greater than 1; a first resource set is one of the K resource sets, a first index is an index of the first resource set in a first resource sub-pool, and a number of resource group(s) comprised in the first resource set is equal to L0, L0 being a positive integer; the first resource sub-pool comprises K1 resource set(s) in the K resource sets, and a number of resource group(s) comprised in any resource set in the first resource sub-pool is equal to the L0, K1 being a positive integer not greater than the K; the first resource set comprises a first resource group, and a second index is an index of the first resource group in the first resource set; the first resource group belongs to a first resource group subset in the M resource group subsets, and the first resource group subset is related to at least one of the first index or the second index.

In one embodiment, the first node U2 is the first node in the present disclosure.

In one embodiment, the second node U1 is the second node in the present disclosure.

In one embodiment, an air interface between the second node U1 and the first node U2 comprises a radio interface between a base station and a UE.

In one embodiment, an air interface between the second node U1 and the first node U2 comprises a radio interface between UEs.

In one embodiment, the first information block is transmitted on a downlink physical layer data channel (i.e., a downlink channel capable of carrying physical layer data).

In one embodiment, the first information block is transmitted on a Physical Downlink Shared Channel (PDSCH).

In one embodiment, the first information block is transmitted on a Physical Sidelink Shared Channel (PSSCH).

In one embodiment, the first-type signaling is transmitted on a downlink physical layer control channel (i.e., a downlink channel that is only capable of carrying a physical layer signaling).

In one embodiment, the first-type signaling is transmitted on a PDCCH.

In one embodiment, the first-type signaling is transmitted on a PDSCH.

In one embodiment, the first-type signaling is transmitted on a Physical Sidelink Control Channel (PSCCH).

In one embodiment, the first signaling is a dynamic signaling.

In one embodiment, the first signaling is a L signaling.

In one embodiment, the first signaling is a L1 control signaling.

In one embodiment, the first signaling comprises DCI.

In one embodiment, the first signaling comprises one or more fields in a piece of DCI.

In one embodiment, the first signaling comprises one or more fields in one piece of Sidelink Control Information (SCI).

In one embodiment, the first signaling comprises DCI for DownLink Grant.

In one embodiment, the first signaling comprises DCI for UpLink Grant.

In one embodiment, the first signaling is transmitted on a PDCCH.

In one embodiment, the first signaling is transmitted on a PSCCH.

In one embodiment, the first node receives the first signaling in the first resource pool, and the first signaling is the first-type signaling.

In one embodiment, the first node receives the first signaling in a resource set in the first resource pool.

In one embodiment, the first node receives the first signaling in the first resource set.

In one embodiment, the first node receives the first signaling in a resource set different from the first resource set in the first resource pool.

In one embodiment, steps in box F51 in FIG. 5 exist, and steps in box F52 do not exist.

In one embodiment, steps in box F51 in FIG. 5 do not exist, and steps in box F52 exist.

In one embodiment, the first signaling comprises scheduling information of the first signal.

In one embodiment, the first signal is a baseband signal.

In one embodiment, the first signal is a radio signal.

In one embodiment, the first signal is a radio-frequency signal.

In one embodiment, the scheduling information comprises one or more of occupied time-domain resources, occupied frequency-domain resources, a Modulation and Coding Scheme (MCS), DMRS configuration information, a Hybrid Automatic Repeat request (HARQ) process number, a Redundancy Version (RV) or a New Data Indicator (NDI).

In one embodiment, the first signal is transmitted on a PDSCH.

In one embodiment, the first signal is transmitted on a PSSCH.

In one embodiment, the first signal is transmitted on a Physical Uplink Shared Channel (PUSCH).

Embodiment 6

Embodiment 6 illustrate a schematic diagram of a first resource group subset being related to at least one of a first index or a second index according to one embodiment of the present disclosure, as shown in FIG. 6.

In one embodiment, the first resource group subset is one of the M resource group subsets.

In one embodiment, the phrase that the first resource group subset is related to a given index includes that a position of the first resource group subset in the M resource group subsets is related to a value of the given index.

In one embodiment, the phrase that the first resource group subset is related to a given index includes that an index of the first resource group subset in the M resource group subsets is related to a value of the given index.

In one embodiment, the first resource group subset is related to only the first index of the first index and the second index.

In one embodiment, the first resource group subset is related to only the second index of the first index and the second index.

In one embodiment, the first resource group subset is related to both the first index and the second index.

In one embodiment, a value of the L0 is used for determining which of the first index and the second index is(are) related to the first resource group subset.

In one embodiment, a value of the K1 is used for determining which of the first index and the second index is(are) related to the first resource group subset.

In one embodiment, if the L0 is greater than 1, the first resource group subset is related to the second index.

In one embodiment, if the L0 is greater than 1, the first resource group subset is related to both the first index and the second index.

In one embodiment, if the L0 is greater than 1, the first resource group subset is related to only the second index of the first index and the second index.

In one embodiment, if the L0 is equal to 1, the first resource group subset is related to only the first index of the first index and the second index.

In one embodiment, if the K1 is equal to 1, the first resource group subset is related to only the second index of the first index and the second index.

In one embodiment, if the K1 is greater than 1, the first resource group subset is related to the first index.

In one embodiment, if the K1 is greater than 1, the first resource group subset is related to both the first index and the second index.

In one embodiment, if the L0 is greater than 1 and the K1 is greater than1, the first resource group subset is related to only the second index of the first index and the second index.

In one embodiment, if the L0 is greater than 1 and the K1 is greater than1, the first resource group subset is related to both the first index and the second index.

In one embodiment, the first resource group subset is related to a PDCCH monitoring occasion when the first resource pool occurs.

In one embodiment, the first resource group subset is related to a PDCCH monitoring occasion when the first resource set occurs.

In one embodiment, a position of the first resource group subset in the M resource group subsets is different in a first PDCCH monitoring occasion and a second PDCCH monitoring occasion, and the first PDCCH monitoring occasion and the second PDCCH monitoring occasion are mutually-orthogonal in time domain.

In one embodiment, the first PDCCH monitoring occasion and the second PDCCH monitoring occasion respectively belong to two mutually-orthogonal time units.

In one embodiment, the first PDCCH monitoring occasion and the second PDCCH monitoring occasion belong to a same time unit.

In one embodiment, the time unit is a slot.

In one embodiment, the time unit is a sub-slot.

In one embodiment, the time unit is a span.

In one embodiment, the time unit is a subframe.

In one embodiment, the time unit is a frame.

In one embodiment, the time unit comprises a positive integer number of multi-carrier symbol(s).

In one embodiment, only the first index in the first index and the second index is used for determining the first resource group subset out of the M resource group subsets.

In one embodiment, only the second index in the first index and the second index is used for determining the first resource group subset out of the M resource group subsets.

In one embodiment, the first index and the second index are used together for determining the first resource group subset out of the M resource group subsets.

In one embodiment, if the first resource group subset is related to only the first index in the first index and the second index, and only the first index in the first index and the second index is used for determining the first resource group subset out of the M resource group subsets.

In one embodiment, if the first resource group subset is related to only the second index in the first index and the second index, and only the second index in the first index and the second index is used for determining the first resource group subset out of the M resource group subsets.

In one embodiment, if the first resource group subset is related to both the first index and the second index, and the first index and the second index are used together for determining the first resource group subset out of the M resource group subsets.

In one embodiment, a sum of the first index and the second index is used for determining the first resource group subset out of the M resource group subsets.

In one embodiment, the M resource group subsets are arranged in order.

In one embodiment, a second information block indicates the M resource group subsets, and the M resource group subsets are arranged in order in the second information block.

In one subembodiment of the above embodiment, the first information block comprises the second information block.

In one subembodiment of the above embodiment, the second information block is carried by an RRC signaling.

In one subembodiment of the above embodiment, the second information block indicates that any resource group in the first resource pool belongs to one of M resource group subsets.

In one embodiment, the M resource group subsets respectively correspond to M first-type indexes, and the M first-type indexes are respectively M non-negative integers; the M resource group subsets are arranged in order according to magnitudes of corresponding first type indexes.

In one subembodiment of the above embodiment, the M resource group subsets are arranged according to corresponding first-type indexes in an ascending order.

In one subembodiment of the above embodiment, the M resource group subsets are arranged according to corresponding first-type indexes in a descending order.

In one subembodiment of the above embodiment, the M first-type indexes are respectively used for identifying the M resource group subsets.

In one subembodiment of the above embodiment, the M first-type indexes are respectively used for identifying the M resource group sets.

In one subembodiment of the above embodiment, the M first-type indexes are respectively M ControlResource-SetIds.

In one subembodiment of the above embodiment, the M first-type indexes are respectively M Se arch Space IDs.

In one subembodiment of the above embodiment, the M first-type indexes are respectively M TCI-StateIds.

In one embodiment, the first resource group subset is an i+1th resource group subset in the M resource group subsets, i being a non-negative integer less than the M.

In one subembodiment of the above embodiment, a value of the i is different in a first PDCCH monitoring occasion and a second PDCCH monitoring occasion, and the first PDCCH monitoring occasion and the second PDCCH monitoring occasion are mutually-orthogonal in time domain.

In one subembodiment of the above embodiment, the i is equal to a sum of the first index and the second index modulo the M.

In one subembodiment of the above embodiment, the i is equal to the first index modulo the M.

In one subembodiment of the above embodiment, the i is equal to the second index modulo the M.

In one subembodiment of the above embodiment, if a value of the first index belongs to a third integer set, the i is equal to the second index modulo the M; and if the first index belongs to a fourth integer set, the i is equal to the second index plus 1 and then modulo the M.

In one subembodiment of the above embodiment, if a value of the first index belongs to a third integer set, the i is equal to a fifth integer; if a value of the first index belongs to a fourth integer set, the i is equal to a sixth integer; the fifth integer and the sixth integer are respectively non-negative integers less than the M, and the fifth integer is not equal to the sixth integer.

In one subembodiment of the above embodiment, the third integer set and the fourth integer set respectively comprise a positive integer number of non-negative integer(s), and there does not exist an integer belonging to the third integer set and the fourth integer set simultaneously.

In one subembodiment of the above embodiment, numbers of integer(s) comprised in the third integer set and the fourth integer set are unequal.

In one subembodiment of the above embodiment, numbers of integer(s) comprised in the third integer set and the fourth integer set are equal.

In one subembodiment of the above embodiment, if a value of the second index belongs to a fifth integer set, the i is equal to the first index modulo the M; and if the second index belongs to a sixth integer set, the i is equal to the first index plus 1 and then modulo the M.

In one subembodiment of the above embodiment, if a value of the second index belongs to a fifth integer set, the i is equal to a fifth integer; if the second index belongs to a sixth integer set, the i is equal to a sixth integer; the fifth integer and the sixth integer are respectively non-negative integers less than the M, and the fifth integer is not equal to the sixth integer.

In one subembodiment of the above embodiment, the fifth integer set and the sixth integer set respectively comprise a positive integer number of non-negative integer(s), and there does not exist an integer belonging to the fifth integer set and the sixth integer set simultaneously.

In one subembodiment of the above embodiment, numbers of integer(s) comprised in the fifth integer set and the sixth integer set are unequal.

In one subembodiment of the above embodiment, numbers of integer(s) comprised in the fifth integer set and the sixth integer set are equal.

In one embodiment, a first given integer modulo a second given integer is equal to (the first given integer) mod (the second given integer).

In one embodiment, the first index is a non-negative integer.

In one embodiment, the first index is a PDCCH candidate index.

In one embodiment, the first index is an index of the first resource set in the K1 resource set(s).

In one embodiment, the K1 is equal to 1, and the first index is equal to 0.

In one embodiment, the first index is a non-negative integer less than the K1.

In one embodiment, the first index is a one of 0, . . . , or K1-1.

In one embodiment, there does not exist two different resource sets with a same index in the first resource sub-pool.

In one embodiment, the second index is a non-negative integer.

In one embodiment, the second index is an index of a CCE in a PDCCH candidate.

In one embodiment, the second index is an index of the first resource group in L0 resource group(s) comprised in the first resource set.

In one embodiment, the L0 is equal to 1, and the second index is equal to 0.

In one embodiment, the second index is a non-negative integer less than the L0.

In one embodiment, the second index is a one of 0, . . . , or L0-1.

In one embodiment, if the L0 is greater than 1, there does not exist two resource groups with a same index in the first resource set.

Embodiment 7

Embodiment 7 illustrates a schematic diagram of M resource group subsets and M spatial relations according to one embodiment of the present disclosure, as shown in FIG. 7. In Embodiment 7, the M resource group subsets respectively correspond to the M spatial relations, and the M spatial relations respectively indicate the M reference signals. In FIG. 7, indexes of the M resource group subsets, the M spatial relations and the M reference signals are respectively #0, . . . , #(M−1).

In one embodiment, the spatial relation comprises a Transmission Configuration Indicator (TCI) state.

In one embodiment, the spatial relation comprises a QCL assumption.

In one embodiment, the spatial relation comprises a QCL parameter.

In one embodiment, the spatial relation comprises a QCL relation.

In one embodiment, the spatial relation comprises spatial setting.

In one embodiment, the spatial relation comprises a spatial relation.

In one embodiment, the spatial relation comprises SpatialRelationInfo.

In one embodiment, the spatial relation comprises a spatial domain filter.

In one embodiment, the spatial relation comprises a spatial domain transmission filter.

In one embodiment, the spatial relation comprises a spatial domain receive filter.

In one embodiment, the spatial relation comprises a Spatial Tx parameter.

In one embodiment, the spatial relation comprises a Spatial Rx parameter.

In one embodiment, the spatial relation comprises large-scale properties.

In one embodiment, the large-scale properties include one or more of delay spread, Doppler spread, Doppler shift, average delay, and a Spatial Rx parameter.

In one embodiment, the M spatial relations respectively and explicitly indicate the M reference signals.

In one embodiment, the M spatial relations respectively and implicitly indicate the M reference signals.

In one embodiment, the M reference signals comprise a Sounding Reference Signal (SRS).

In one embodiment, the M reference signals comprise a Channel State Information-Reference Signal (CSI-RS).

In one embodiment, the M reference signals comprise a Synchronization Signal/physical broadcast channel Block (SSB).

In one embodiment, any of the M reference signals in a CSI-RS or an SSB.

In one embodiment, any of the M reference signals is a CSI-RS, an SRS or an SSB.

In one embodiment, the M spatial relations respectively correspond to M second-type indexes, the M second-type indexes are respectively M non-negative integers, and the M second-type indexes are mutually unequal.

In one subembodiment of the above embodiment, the M second-type indexes are respectively used for identifying the M spatial relations.

In one subembodiment of the above embodiment, the M second-type indexes are respectively M TCI-StateIds.

In one subembodiment of the above embodiment, the M second-type indexes are respectively M SpatialRelationInfolds.

In one subembodiment of the above embodiment, the M second-type indexes respectively indicate the M reference signals.

In one embodiment, any two of the M reference signals cannot be assumed to be QCLed.

In one embodiment, any two of the M reference signals cannot be assumed to be QCLed with a corresponding QCL type of QCL-TypeD.

In one embodiment, a first reference signal and a second reference signal are ant two of the M reference signals, and any transmitting antenna port of the first reference signal and any transmitting antenna port of the second reference signal cannot be assumed to be QCLed.

In one embodiment, a first reference signal and a second reference signal are any two of the M reference signals, and any transmitting antenna port of the first reference signal and any transmitting antenna port of the second reference signal cannot be assumed to be QCLed with a corresponding QCL type of QCL-TypeD.

In one embodiment, a first reference signal and a second reference signal are any two of the M reference signals; a first antenna port is any transmitting antenna port of the first reference signal, and a second antenna port is any transmitting antenna port of the second reference signal; large-scale properties of a channel over which a radio signal transmitted by the first antenna port is conveyed cannot be used for inferring large-scale properties of a channel over which a radio signal transmitted by the second antenna port is conveyed.

Embodiment 8

Embodiment 8 illustrates a schematic diagram of relations among L resource groups and M resource group subsets according to one embodiment of the present disclosure, as shown in FIG. 8. In Embodiment 8, the first resource set comprises the L resource groups, for any given resource group subset in the M resource group subsets, there exists one of the L resource groups belonging to the given resource group subset. In FIG. 8, indexes of the M resource group subsets are respectively #0, . . . , #(M−1).

In one embodiment, the first resource group is one of the L resource groups.

In one embodiment, the first resource set is any of the K resource sets in which a number of comprised resource groups is equal to the L.

In one embodiment, if the L0 is equal to L and the L is a positive integer not less than the M, there exist one of the L resource groups belonging to the given resource group subset.

In one embodiment, the first resource set consists of the L resource groups.

In one embodiment, the L is equal to the M.

In one embodiment, the L is greater than the M.

In one embodiment, the L is equal to the M, and the L resource groups respectively belong to the M resource group subsets.

In one embodiment, the L is greater than the M; the L resource groups are divided into M subgroups, and any of the M subgroups consists of a positive integer number of resource group(s) in the L resource groups; the M subgroups respectively correspond to the M resource group subsets, and each resource group in any of the M subgroups belongs to a corresponding resource group subset.

In one embodiment, numbers of resource group(s) comprised in any two subgroups in the M subgroups are equal.

In one embodiment, there exist numbers of resource group(s) comprised in two of the M subgroups being equal.

In one embodiment, there exist numbers of resource group(s) comprised in two subgroups in the M subgroups being unequal.

In one embodiment, the M subgroups are frequency division multiplexing.

In one embodiment, the M subgroups are time division multiplexing.

In one embodiment, the M subgroups are space division multiplexing.

In one embodiment, a first subgroup and a second subgroup are any two different subgroups in the M subgroups, a second resource group is any resource group in the first subgroup, and a third resource group is any resource group in the second subgroup.

In one subembodiment of the above embodiment, the second resource group and the third resource group occupy mutually-orthogonal frequency-domain resources and same time-domain resources.

In one subembodiment of the above embodiment, the second resource group and the third resource group occupy mutually-orthogonal time-domain resources.

In one subembodiment of the above embodiment, the second resource group and the third resource group occupy same time-frequency resources and different DMRS ports.

In one embodiment, the L is equal to a product of S and the M, S being a positive integer; S resource group(s) in the L resource groups belongs (belong) to the given resource group subset.

In one embodiment, a third resource set is any resource set different from the first resource set and in which a number of comprised resource groups is equal to the L in the K resource sets; a number of resource groups belonging to the given resource group subset in the first resource set is equal to a number of resource groups belonging to the given resource group subset in the third resource set.

Embodiment 9

Embodiment 9 illustrates a schematic diagram of L1 resource groups in a first resource group subset according to one embodiment of the present disclosure, as shown in FIG. 9. In Embodiment 9, the first resource group subset comprises P resource groups, P being a positive integer greater than 1; the L1 resource groups in the first resource set belong to the first resource group subset, and indexes of the L1 resource groups in the first resource group subset are consecutive. In FIG. 9, the indexes of the L1 resource groups are respectively #0, # (L1-1); the indexes of the L1 resource groups in the first resource group subset are respectively index #0, . . . , index #(L1-1); and the index #0, . . . , the index #(L1-1) are L1 consecutive non-negative integers.

In one embodiment, when there exist only L1 resource groups in the first resource set belonging to the first resource group subset and L1 is a positive integer greater than 1, indexes of the L1 resource groups in the first resource group subset are consecutive.

In one embodiment, if there exist only L1 resource groups in the first resource set belonging to the first resource group subset and L1 is a positive integer greater than 1, indexes of the L1 resource groups in the first resource group subset are consecutive.

In one embodiment, the indexes of the L1 resource groups in the first resource group subset refers to indexes of the L1 resource groups in the first resource group subset in a same PDCCH monitoring occasion.

In one embodiment, the phrase that indexes of the L1 resource groups in the first resource group subset are consecutive includes that the indexes of the L1 resource groups in the first resource group subset in a PDCCH monitoring occasion are consecutive.

In one embodiment, the phrase that indexes of the L1 resource groups in the first resource group subset are consecutive includes that the indexes of the L1 resource groups in the first resource group subset in any PDCCH monitoring occasion are consecutive.

In one embodiment, the first resource group is one of the L1 resource groups.

In one embodiment, an index of any of the L1 resource groups in the first resource group subset is a non-negative integer.

In one embodiment, the L1 resource groups are respectively L1 CCEs, and an index of any of the L1 resource groups in the first resource group subset is an index of a CCE.

In one embodiment, the first resource group subset is a CORESET, the L1 resource groups are respectively L1 CCEs, and the indexes of the L1 resource groups in the first resource group subset are respectively indexes of the L1 CCEs in the CORESET.

In one embodiment, the first resource group subset consists of the P resource groups.

In one embodiment, the index of any given resource group in the L1 resource groups in the first resource group subset is an index of the given resource group in the P resource groups.

In one embodiment, the index of any given resource group in the L1 resource groups in the first resource group subset is a non-negative integer less than the P.

In one embodiment, the index of any given resource group in the L1 resource groups in the first resource group subset is one of 0, . . . , or the P−1.

In one embodiment, the P resource groups in the first resource group subset are indexed in order.

In one embodiment, the P resource groups are indexed in order in the first resource group subset according to frequency-domain positions.

In one embodiment, the P resource groups are indexed in order in the first resource group subset according to occupied frequency-domain resources in an ascending order.

In one embodiment, the P resource groups are indexed in order in the first resource group subset according to occupied frequency-domain resources in a descending order.

In one embodiment, the P resource groups are indexed in order in the first resource group subset according to frequency-domain first and then time-domain.

In one embodiment, the P resource groups are indexed in order in the first resource group subset according to time-domain first and then frequency-domain.

In one embodiment, P BWPs are respectively first BWPs occupied by the P resource groups, and the P resource groups are indexed in order in the first resource group subset according to the P BWPs in frequency domain in an ascending order.

In one embodiment, P BWPs are respectively first BWPs occupied by the P resource groups, and the P resource groups indexed in order in the first resource group subset are according to the P BWPs in frequency domain in a descending order.

In one embodiment, indexes of the P resource groups in the first resource group subset follow the method in 3GPP TS38.211, section 7. 3. 2. 2.

In one embodiment, the P resource groups respectively correspond to P second-type values, and the P second-type values are respectively P non-negative integers; the P resource groups are indexed in order in the first resource group subset according to magnitude of corresponding second-type values.

In one subembodiment of the above embodiment, the P resource groups are indexed in order according to magnitude of corresponding second-type values in an ascending order.

In one subembodiment of the above embodiment, the P resource groups are indexed in order according to magnitude of corresponding second-type values in a descending order.

In one subembodiment of the above embodiment, the P second-type values are respectively P CCE indexes.

In one subembodiment of the above embodiment, the P second-type values are respectively indexes of the P resource groups in a first resource group set, and the first resource group set is a resource group set corresponding to the first resource group subset in the M resource group sets; the first resource group set comprises P0 resource groups, P0 is a positive integer not less than the P; and any of the P second-type values is one of 0, . . . , or the P0-1.

In one subembodiment of the above embodiment, the first resource group subset belongs to a CORESET, the P resource groups are P CCEs, and the P second-type values are respectively indexes of the P CCEs in the CORESET.

In one embodiment, an index of the first resource group in the first resource group subset is related to a PDCCH monitoring occasion when the first resource set occurs.

In one embodiment, the index of the first resource group in the first resource group subset in a first PDCCH monitoring occasion is equal to a first index value; the index of the first resource group in the first resource group subset in a second PDCCH monitoring occasion is equal to a second index value; the first PDCCH monitoring occasion and the second PDCCH monitoring occasion are mutually orthogonal, and the first index value is not equal to the second index value.

In one embodiment, the L1 resource groups are consecutive in frequency domain.

In one embodiment, the L1 resource groups are inconsecutive in frequency domain.

Embodiment 10

Embodiment 10 illustrates a schematic diagram of a first resource set and a second resource set according to one embodiment of the present disclosure, as shown in FIG. 10. In Embodiment 10, a number of resource groups comprised in the second resource set is equal to the L; a number of resource group(s) belonging to the first resource group subset in the first resource set is not equal to a number of resource group(s) belonging to the first resource group subset in the second resource set.

In one embodiment, a number of resource group(s) belonging to the first resource group subset in the second resource set is equal to 0.

In one embodiment, a number of resource group(s) belonging to the first resource group subset in the second resource set is greater than 0.

In one embodiment, a number of resource group(s) belonging to the first resource group subset in the first resource set is related to the first index.

In one embodiment, if a value of the first index belongs to a first integer set, and a number of resource group(s) belonging to the first resource group subset in the first resource set is equal to a first integer; if a value of the first index belongs to a second integer set, and a number of resource group(s) belonging to the first resource group subset in the first resource set is equal to a second integer; the first integer is not equal to the second integer.

In one embodiment, a number of resource group(s) belonging to the first resource group subset in the first resource set is related to a position of the first resource group subset in the M resource group subsets.

In one embodiment, a number of resource group(s) belonging to the first resource group subset in the first resource set is related to an index of the first resource group subset in the M resource group subsets.

In one embodiment, the first resource group subset is an i+1th resource group subset in the M resource group subsets, i is a non-negative integer less than the M; if a value of the i belongs to a first integer set, and a number of resource group(s) belonging to the first resource group subset in the first resource set is equal to a first integer; if a value of the i belongs to a second integer set, and a number of resource group(s) belonging to the first resource group subset in the first resource set is equal to a second integer; the first integer is not equal to the second integer.

In one embodiment, the first integer set and the second integer set respectively comprise a positive integer number of non-negative integers, and there does not exist an integer that belongs to the first integer set and the second integer set simultaneously.

In one embodiment, the first integer and the second integer are respectively non-negatives not greater than the L0.

In one embodiment, a number of resource group(s) belonging to the first resource group subset in the first resource set is related to both a position of the first resource group subset in the M resource group subsets and the first index.

In one embodiment, a number of resource group(s) belonging to the first resource group subset in the first resource set is related to both an index of the first resource group subset in the M resource group subsets and the first index.

Embodiment 11

Embodiment 11 illustrates a schematic diagram of M resource group subsets and M reference values according to one embodiment of the present disclosure, as shown in FIG. 11. In Embodiment 11, the M resource group subsets respectively correspond to the M reference values. In FIG. 11, indexes of the M resource group subsets and the M reference values are respectively #0, . . . , #(M−1).

In one embodiment, the M reference values are respectively related to identities of the M resource group subsets.

In one embodiment, identities of the M resource group subsets are used for determining the M reference values.

In one embodiment, the M reference values are respectively non-negative integers.

In one embodiment, there exist two unequal reference values in the M reference values.

In one embodiment, the M reference values are mutually unequal.

In one embodiment, there exist two equal reference values in the M reference values.

In one embodiment, for any PDCCH monitoring occasion, there exist two unequal reference values in the M reference values.

In one embodiment, for any PDCCH monitoring occasion of a search space set corresponding to the first resource pool, there exist two unequal reference values in the M reference values.

In one embodiment, any reference value of the M reference values is related to an index of a time unit in which the first resource pool occurs.

In one embodiment, any reference value of the M reference values is related to an index of a time unit in which the first resource set occurs.

In one embodiment, any of the M reference values is unequal in a first time unit and a second time unit, and the first time unit and the second time unit are mutually-orthogonal.

In one embodiment, any of the M reference values is related to an identity of a corresponding resource group subset.

In one embodiment, any of the M reference values is related to an identity of a corresponding resource group set.

In one embodiment, any of the M reference values is related to a corresponding ControlResourceSetId of a corresponding resource group subset.

In one embodiment, M reference groups are respectively used for determining the M reference values, and any reference group in the M reference group is related to an identity of a corresponding resource group subset; for a value of any given identity of any resource group subset, a value of a parameter in a corresponding reference group is fixed.

Embodiment 12

Embodiment 12 is a schematic diagram of an index of a first resource group in a first resource group subset according to one embodiment of the present disclosure, as shown in FIG. 12. In Embodiment 12, the indexes of the first resource group in the first resource group subset are respectively and linearly related to a first-type integer and a second-type integer; the first-type integer is equal to a third-type integer modulo a fourth-type integer; the third-type integer is related to the first index; the fourth integer is related to P, and the P is a number of resource group(s) comprised in the first resource group; the second-type integer is related to the second index; a linear coefficient between the index of the first resource group in the first resource group subset and the first-type integer is a first coefficient, a linear coefficient between the index of the first resource group in the first resource group subset and the second-type integer is a second coefficient, and the first coefficient and the second coefficient are respectively non-negative integers.

In one embodiment, the index of the first resource group in the first resource group subset refers to an index of the first resource group in the first resource group subset in a given PDCCH monitoring occasion.

In one embodiment, the given PDCCH monitoring occasion is any PDCCH monitoring occasion.

In one embodiment, the given PDCCH monitoring occasion is any PDCCH monitoring occasion in a search space set corresponding to the first resource pool.

In one embodiment, the first coefficient is related to the L0.

In one embodiment, the first coefficient is related to the M.

In one embodiment, the first coefficient is equal to the L0.

In one embodiment, the first coefficient is equal to an integer obtained by the L0 divided by the M and then rounded up to a nearest integer.

In one embodiment, the second coefficient is equal to 1.

In one embodiment, the second coefficient is not equal to 1.

In one embodiment, the index of the first resource group in the first resource group subset is equal to a product of the first coefficient and the first-type integer plus a product of the second coefficient and the second-type integer.

In one embodiment, the second-type integer is equal to the second index.

In one embodiment, the second-type integer is related to the M.

In one embodiment, the second-type integer is equal to a value obtained by the second index divided by the M and then rounded down to a nearest integer.

In one embodiment, the second-type integer is equal to the second index modulo the M.

In one embodiment, the third-type integer is related to the first reference value.

In one embodiment, the third-type integer is linearly related to the first reference value, and a linear coefficient between the third-type integer and the first reference value is equal to 1.

In one embodiment, the third-type integer is linearly related to the first reference value in the given PDCCH monitoring occasion and a corresponding linear coefficient is equal to 1.

In one embodiment, the third-type integer is related to the M reference values.

In one embodiment, the third-type integer is linearly related to one of the M reference values and a corresponding linear coefficient is equal to 1.

In one embodiment, the third-type integer is linearly related to one of the M reference values in the given PDCCH monitoring occasion and a corresponding linear coefficient is equal to 1.

In one embodiment, the third-type integer is linearly related to a fifth integer, a linear coefficient between the third-type integer and the fifth-type integer is equal to 1, the fifth-type integer is equal to a first value rounded down to a nearest integer, and the first value is related to the first index; the first value is a non-negative real number.

In one subembodiment of the above embodiment, the first value is linearly related to the first index.

In one subembodiment of the above embodiment, a linear coefficient between the first value and the first index is equal to the P divided by a sixth-type integer, and the sixth integer is related to the L0.

In one subembodiment of the above embodiment, a linear coefficient between the first value and the first index is equal to a total number of resource groups comprised in the M resource group subsets divided by a sixth-type integer, and the sixth-type integer is related to the L0.

In one subembodiment of the above embodiment, the sixth-type integer is related to the K1.

In one subembodiment of the above embodiment, the sixth integer is related to K2, the K2 is related to the K1, and the K2 is not less than the K1.

In one subembodiment of the above embodiment, the K2 is equal to the K1.

In one subembodiment of the above embodiment, the K2 is greater than the K1.

In one subembodiment of the above embodiment, the K2 is equal to a largest second-type reference integer of W0 second-type reference integers, W0 is a positive integer greater than 1, and the K1 is one of the W0 second-type reference integers; the W0 second-type reference integers respectively correspond to W0 serving cells.

In one subembodiment of the above embodiment, the W0 second-type reference integers are respectively numbers of PDCCH candidates for the W0 serving cells comprised in a search space set corresponding to the first resource pool and with a CCE aggregation level equal to the L0.

In one subembodiment of the above embodiment, the sixth-type integer is equal to a product of the L0 and the K2.

In one subembodiment of the above embodiment, the sixth-type integer is equal to a product obtained by the L0 divided by the M and then rounded up to a nearest integer multiplied the K2.

In one subembodiment of the above embodiment, the sixth-type integer is obtained by a product of the L0 and the K2 divided by the M and then rounded up to a nearest integer.

In one embodiment, the third-type integer is linearly related to a third-type index, and a linear coefficient between the third-type integer and the third-type index is equal to 1; the third-type index is an index of a serving cell.

In one subembodiment of the above embodiment, an index of a serving cell to which the first resource pool belongs is the third-type index.

In one embodiment, the third-type integer is linearly related to a seventh-type integer, a linear coefficient between the third-type integer and the seventh-type integer is equal to 1, and the seventh integer is related to both the first index and the P.

In one embodiment, the fourth-type integer is related to the L0.

In one embodiment, the fourth-type integer is related to the M.

In one embodiment, the fourth-type integer is related to a total number of resource groups comprised in the M resource group subsets.

In one embodiment, the fourth-type integer is obtained by the P divided by the L0 and then rounded down to a nearest integer.

In one embodiment, the fourth-type integer is obtained by the P multiplied by the M, divided by the L0 and then rounded down to a nearest integer.

In one embodiment, the fourth-type integer is equal to the P divided by an eighth-type integer and then rounded down to a nearest integer, and the fourth-type integer is equal to the L0 divided by the M and then rounded up to a nearest integer.

In one embodiment, the fourth-type integer is obtained by a total number of resource groups comprised in the M resource group subsets divided by the L0 and then rounded down to a nearest integer.

Embodiment 13

Embodiment 13 is a schematic diagram of an index of a first resource group according to one embodiment of the present disclosure, as shown in FIG. 13. In Embodiment 13, a reference group set consists of the M resource group subsets, and all resource groups in the reference resource group set are indexed in order; an index of the first resource in the reference resource group set is respectively and linearly related the first-type integer and the second-type integer; a linear coefficient between the index of the first resource group in the first reference resource group set and the first-type integer is the first coefficient, and a linear coefficient between the index of the first resource group in the reference resource group set and the second-type integer is the second integer.

In one embodiment, resource groups in the reference group set are indexed in order according to resource group subset first, and then frequency domain.

In one embodiment, resource groups in the reference group set are indexed in order according to frequency domain first, and then resource group subset.

In one embodiment, resource groups in the reference group set are indexed in order according to resource group subset first, and then indexes of resource groups in a resource group subset to which they belong.

In one embodiment, a resource group (x, y) is used for representing a resource group indexed as y in a resource group subset indexed as x in the M resource group subsets, the x is a non-negative integer less than the M, and the y is a non-negative integer; resource groups in the reference resource group sets are respectively resource group (0, 0), . . . , resource group (M−1, 0), resource group (0, 1), . . . , resource group (M−1, 1), . . . according to indexes in the reference resource group set in an ascending order.

Embodiment 14

Figures 14, 15, 16, 17:
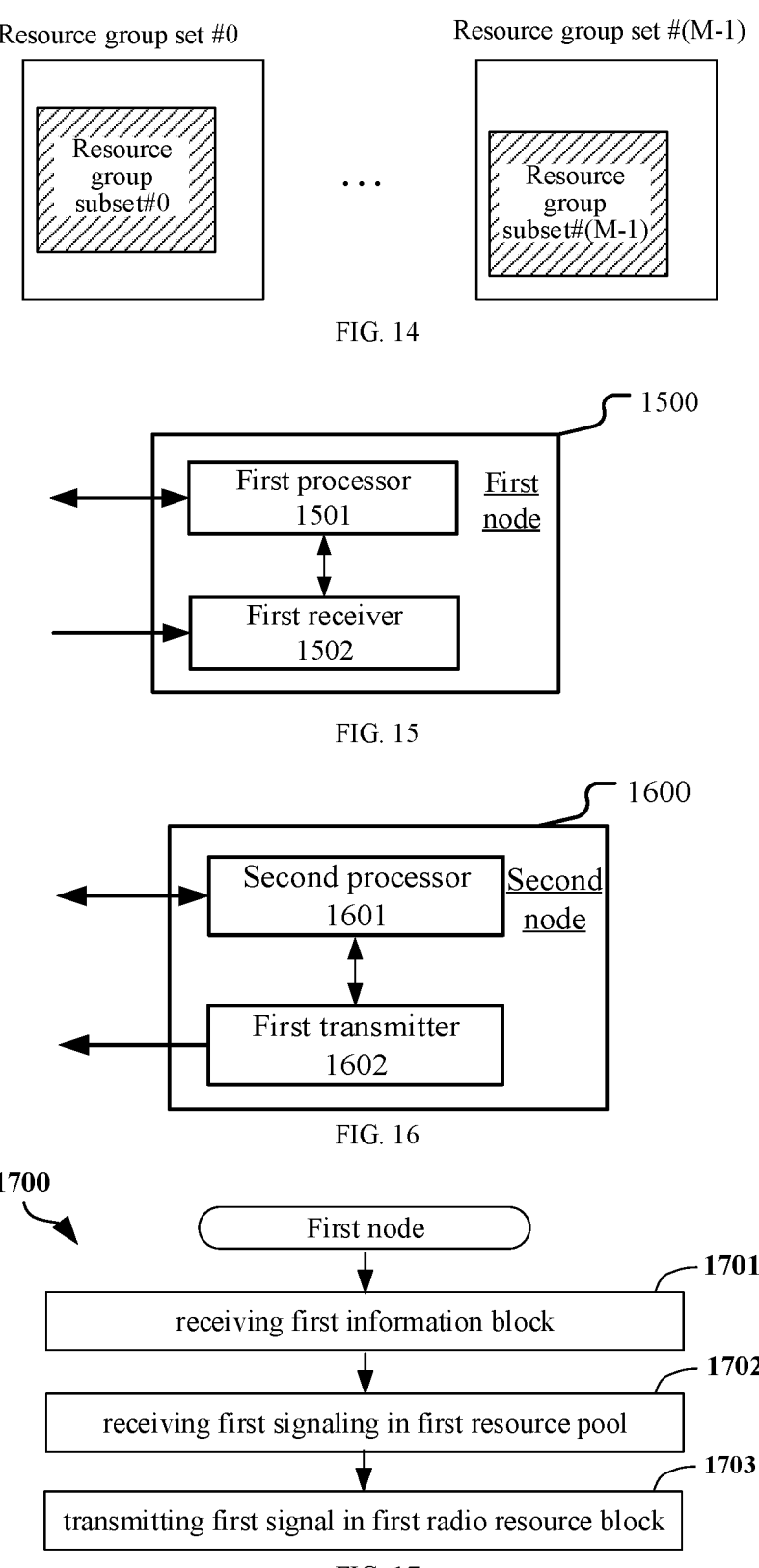
FIG. 14 illustrates a schematic diagram of M resource group subsets and M resource group sets according to one embodiment of the present disclosure.
FIG. 15 illustrates a structure block diagram of a processing device in a first node according to one embodiment of the present disclosure.
FIG. 16 illustrates a structure block diagram of a processing device in a second node according to one embodiment of the present disclosure.
FIG. 17 illustrates a flowchart of a first information block, a first signaling and a first signal according to one embodiment of the present disclosure.

Embodiment 14 illustrates a schematic diagram of M resource group subsets and M resource group sets according to one embodiment of the present disclosure, as shown in FIG. 14. In Embodiment 14, the M resource group subsets respectively belong to the M resource group sets, and the first information block is used for respectively indicating the M resource group subsets out of the M resource group sets. In FIG. 14, indexes of the M resource group sets and the M resource group subsets are respectively #0, . . . , #(M−1).

In one embodiment, any resource group set in the M resource group sets comprises a positive integer number of resource group(s).

In one embodiment, any resource group set in the M resource group sets comprises a positive integer number of CCE(s).

In one embodiment, the M resource group sets respectively belong to M CORESETs.

In one embodiment, the M resource group sets are respectively M CORESETs.

In one embodiment, the M resource group sets respectively correspond to the M spatial relations.

In one embodiment, the M resource group sets correspond to a same CCE-to-REG mapping.

In one embodiment, the M resource group sets correspond to a same Precoder Granularity.

In one embodiment, the M resource group sets respectively correspond to M ControlResourceSetIds.

In one embodiment, the M resource group sets respectively correspond to M SearchSpaceIDs.

In one embodiment, the M resource group sets respectively correspond to M TCI-StateIds.

In one embodiment, the M resource group sets belong to a same Carrier in frequency domain.

In one embodiment, the M resource group sets belong to a same serving cell.

In one embodiment, the M resource group sets belong to a same BWP in frequency domain.

In one embodiment, any given resource group subset in the M resource group subsets comprises a positive integer number of resource group(s) in a corresponding resource group set.

In one embodiment, any given resource group subset in the M resource group subsets consists of a positive integer number of resource group(s) in a corresponding resource group set.

In one embodiment, there exists one of the M resource group subsets comprising all resource groups in a corresponding resource group set.

In one embodiment, there exists one of the M resource group subsets only comprising part of resource groups in a corresponding resource group set.

In one embodiment, the first information block explicitly indicates the M resource group subsets respectively out of the M resource group sets.

In one embodiment, the first information block implicitly indicates the M resource group subsets respectively out of the M resource group sets.

In one embodiment, the first information block indicates whether resource groups in any two of the M resource group subsets can occupy overlapping time-frequency resources.

In one embodiment, the first information block indicates whether resource groups in any two of the M resource group subsets can occupy overlapping frequency-domain resources.

In one embodiment, the first information block comprises M bit strings, and the M bit strings respectively correspond to the M resource group sets; for any given bit string in the M bit strings, the given bit string indicates a corresponding resource group subset out of a corresponding resource group set.

In one subembodiment of the above embodiment, the given bit string comprises P1 bits, a resource group set corresponding to the given bit string comprises P1 resource groups, P1 being a positive integer greater than; the P1 bits respectively indicate whether the P1 resource groups belong to the resource group subset corresponding to the given bit string.

In one subembodiment of the above embodiment, for any given bit in the P1 bits, if the given bit is equal to a first bit value, a resource group corresponding to the given bit belongs to the resource group subset corresponding to the given bit string; otherwise, a resource group corresponding to the given bit does not belong to the resource group subset corresponding to the given bit string.

In one embodiment, numbers of resource groups comprised in any two of the M resource group subsets are equal.

In one embodiment, there exist numbers of resource groups comprised in two of the M resource group subsets being equal.

In one embodiment, there exist numbers of resource groups comprised in two of the M resource group subsets being unequal.

Embodiment 15

Embodiment 15 illustrates a structure block diagram of a processing device in a first node according to one embodiment of the present disclosure, as shown in FIG. 15. In FIG. 15, a first node's processing device 1500 comprises a first processor 1501 and a first receiver 1502.

in Embodiment 15, the first processor 1501 receives a first information block; and the first receiver 1502 monitors a first-type signaling in a first resource pool.

In Embodiment 15, the first information block is used for determining the first resource pool; the first resource pool comprises K resource sets, K being a positive integer greater than 1; any of the K resource sets comprises a positive integer number of resource group(s), any resource group in the first resource pool belongs to one of M resource group subsets, M being a positive integer number greater than 1; a first resource set is one of the K resource sets, a first index is an index of the first resource set in a first resource sub-pool, and a number of resource group(s) comprised in the first resource set is equal to L0, L0 being a positive integer; the first resource sub-pool comprises K1 resource set(s) in the K resource sets, and a number of resource group(s) comprised in any resource set in the first resource sub-pool is equal to the L0, K1 being a positive integer not greater than the K; the first resource set comprises a first resource group, and a second index is an index of the first resource group in the first resource set; the first resource group belongs to a first resource group subset in the M resource group subsets, and the first resource group subset is related to at least one of the first index or the second index.

In one embodiment, the first receiver 1502 receives a first signaling in the first resource pool, and the first signaling is the first-type signaling.

In one embodiment, the first processor 1501 receives a first signal; herein, the first signaling comprises scheduling information of the first signal.

In one embodiment, the first processor 1501 transmits a first signal; herein, the first signaling comprises scheduling information of the first signal.

In one embodiment, the M resource group subsets respectively correspond to M spatial relations, and the M spatial relations respectively indicate M reference signals.

In one embodiment, when the L0 is equal to L and the L is a positive integer not less than the M, the first resource set comprises L resource groups, for any given resource group subset in the M resource group subsets, there exists a resource group in the L resource groups belonging to the given resource group subset.

In one embodiment, when L1 resource groups in the first resource set belong to the first resource group subset and L1 is a positive integer greater than 1, indexes of the L1 resource groups in the first resource group subset are consecutive.

In one embodiment, a second resource set is a resource set different from the first resource set in the K resource sets; a number of resource groups comprised in the second resource set is equal to the L; a number of resource group(s) belonging to the first resource group subset in the first resource set is not equal to a number of resource group(s) belonging to the first resource group subset in the second resource set.

In one embodiment, the M resource group subsets respectively correspond to M reference values; an index of the first resource group in the first resource group subset is related to a first reference value, and the first reference value is a reference value corresponding to the first resource group subset in the M reference values.

In one embodiment, the M resource group subsets respectively belong to M resource group sets, and the first information block is used for respectively indicating the M resource group subsets out of the M resource group sets.

In one embodiment, the first node is a UE.

In one embodiment, the first node is a relay node.

In one embodiment, the first processor 1501 comprises at least one of the antenna 452, the receiver/transmitter 454, the receiving processor 456, the transmitting processor 468, the multi-antenna receiving processor 458, the multi-antenna transmitting processor 457, the controller/processor 459, the memory 460 or the data source 467 in Embodiment 4.

In one embodiment, the first receiver 1502 comprises at least one of the antenna 452, the receiver 454, the receiving processor 456, the multi-antenna receiving processor 458, the controller/processor 459, the memory 460, or the data source 467 in Embodiment 4.

Embodiment 16

Embodiment 16 illustrates a structure block diagram of a processing device in a second node according to one embodiment of the present disclosure, as shown in FIG. 16. In FIG. 16, a second node's processing device 1600 comprises a second processor 1601 and a first transmitter 1602.

In Embodiment 16, the second processor 1601 transmits a first information block; and the first transmitter 1602 transmits a first signaling in a first resource pool.

In Embodiment 16, the first information block is used for determining the first resource pool; the first resource pool comprises K resource sets, K being a positive integer greater than 1; any of the K resource sets comprises a positive integer number of resource group(s), any resource group in the first resource pool belongs to one of M resource group subsets, M being a positive integer number greater than 1; a first resource set is one of the K resource sets, a first index is an index of the first resource set in a first resource sub-pool, and a number of resource group(s) comprised in the first resource set is equal to L0, L0 being a positive integer; the first resource sub-pool comprises K1 resource set(s) in the K resource sets, and a number of resource group(s) comprised in any resource set in the first resource sub-pool is equal to the L0, K1 being a positive integer not greater than the K; the first resource set comprises a first resource group, and a second index is an index of the first resource group in the first resource set; the first resource group belongs to a first resource group subset in the M resource group subsets, and the first resource group subset is related to at least one of the first index or the second index.

In one embodiment, the second processor 1601 transmits a first signal; herein, the first signaling comprises scheduling information of the first signal.

In one embodiment, the second processor 1601 receives a first signal; herein, the first signaling comprises scheduling information of the first signal.

In one embodiment, the M resource group subsets respectively correspond to M spatial relations, and the M spatial relations respectively indicate M reference signals.

In one embodiment, when the L0 is equal to L and the L is a positive integer not less than the M, the first resource set comprises L resource groups, for any given resource group subset in the M resource group subsets, there exists a resource group in the L resource groups belonging to the given resource group subset.

In one embodiment, when L1 resource groups in the first resource set belong to the first resource group subset and L1 is a positive integer greater than 1, indexes of the L1 resource groups in the first resource group subset are consecutive.

In one embodiment, a second resource set is a resource set different from the first resource set in the K resource sets; a number of resource groups comprised in the second resource set is equal to the L; a number of resource group(s) belonging to the first resource group subset in the first resource set is not equal to a number of resource group(s) belonging to the first resource group subset in the second resource set.

In one embodiment, the M resource group subsets respectively correspond to M reference values; an index of the first resource group in the first resource group subset is related to a first reference value, and the first reference value is a reference value corresponding to the first resource group subset in the M reference values.

In one embodiment, the M resource group subsets respectively belong to M resource group sets, and the first information block is used for respectively indicating the M resource group subsets out of the M resource group sets.

In one embodiment, the second node is a base station.

In one embodiment, the second node is a UE.

In one embodiment, the second node is a relay node.

In one embodiment, the second processor 1601 comprises at least one of the antenna 420, the receiver/transmitter 418, the receiving processor 470, the transmitting processor 416, the multi-antenna receiving processor 472, the multi-antenna transmitting processor 471, the controller/processor 475, or the memory 476 in Embodiment 4.

In one embodiment, the second transmitter 1602 comprises at least one of the antenna 420, the transmitter 418, the transmitting processor 416, the multi-antenna transmitting processor 471, the controller/processor 475, or the memory 476 in Embodiment 4.

Embodiment 17

Embodiment 17 illustrates a flowchart of a first information block, a first signaling and a first signal according to one embodiment of the present disclosure, as shown in FIG. 17. In step 1700 illustrated by FIG. 17, each box represents a step. Particularly, the sequential order of steps in these boxes does not necessarily mean that the steps are chronologically arranged.

In Embodiment 17, the first node in the present disclosure receives a first information block in step 1701; receives a first signaling in a first resource pool in step 1702; transmits a first signal in a first radio resource block in step 1703. herein, the first signaling is used for determining the first radio resource block; the first resource pool comprises more than one resource group; the first signaling occupies a first resource set, the first resource set comprises a positive integer number of resource group(s), and any resource group in the first resource set belongs to the first resource pool; a reference signal transmitted in any resource group comprised in the first resource pool is spatially related to one of the M reference signals; a first resource group is a resource group in the first resource set, and a reference signal transmitted in the first resource group is spatially related to a first reference signal in the M reference signals; the first resource group is used for determining a first index, and the first index and the first reference signal are used together for determining the first radio resource block.

In one embodiment, the first information block is carried by a higher-layer signaling.

In one embodiment, the first information block is carried by an RRC signaling.

In one embodiment, the first information block is carried by a MAC CE signaling.

In one embodiment, the first information block is carried by an RRC signaling and a MAC CE together.

In one embodiment, the first information block comprises information in all or part of fields in an Information Element (IE).

In one embodiment, the first information block comprises information in all or part of fields in a SearchSpace IE.

In one embodiment, the first information block comprises information in all or part of fields in a ControlResourceSet IE.

In one embodiment, the M is equal to 2.

In one embodiment, the M is greater than 2.

In one embodiment, the first resource pool comprises time-domain resources.

In one embodiment, the first resource pool comprises frequency-domain resources.

In one embodiment, the first resource pool comprises code-domain resources.

In one embodiment, the code-domain resources comprise one or more of a DMRS port, a DMRS CDM group, a pseudo-random sequence, a Zadoff-Chu sequence, a low Peak-to-Average Power Ratio (PAPR) sequence, a cyclic shift, an OCC or an orthogonal sequence.

In one embodiment, the first resource pool occupies more than one RE in the time-frequency domain.

In one embodiment, an RE occupies a multicarrier symbol in time domain, and a subcarrier in frequency domain.

In one embodiment, the multicarrier symbol is an OFDM symbol.

In one embodiment, the multicarrier symbol is an SC-FDMA symbol.

In one embodiment, the multicarrier symbol is a DFT-S-OFDM symbol.

In one embodiment, the first resource pool occupies more than one subcarrier in frequency domain.

In one embodiment, the first resource pool occupies more than one PRB in frequency domain.

In one embodiment, the first resource pool occupies a positive integer number of multi-carrier symbol(s) in time domain.

In one embodiment, the first resource pool occupies a positive integer number of slot(s) in time domain.

In one embodiment, the first resource pool occurs only once in time domain.

In one embodiment, the first resource pool occurs multiple times in time domain.

In one embodiment, the first resource pool occurs periodically in time domain.

In one embodiment, the first resource pool occurs aperiodically in time domain.

In one embodiment, the first resource pool comprises a CORESET.

In one embodiment, the first resource pool comprises a search space set.

In one embodiment, the first resource pool is a CORESET.

In one embodiment, the first resource pool is a search space set.

In one embodiment, the first resource pool comprises a positive integer number of PDCCH candidate(s).

In one embodiment, the first resource pool comprises more than one CCE.

In one embodiment, the first resource pool comprises more than one REG.

In one embodiment, the first resource set occupies more than one RE in time-frequency domain.

In one embodiment, the first resource set occupies more than one PRB in frequency domain.

In one embodiment, the first resource set occupies a positive integer number of multi-carrier symbol(s) in time domain.

In one embodiment, the first resource set comprises more than one resource group.

In one embodiment, the first resource set only comprises one resource group.

In one embodiment, the first resource set comprises a PDCCH candidate.

In one embodiment, the first resource set is a PDCCH candidate.

In one embodiment, the first resource set comprises a positive integer number of CCE(s).

In one embodiment, the first resource set comprises more than one REG.

In one embodiment, any resource group in the first resource pool occupies more than one RE in time-frequency domain.

In one embodiment, any resource group in the first resource pool occupies more than one PRB in frequency domain.

In one embodiment, any resource group in the first resource pool occupies a positive integer number multicarrier symbol(s) in time domain.

In one embodiment, any resource group in the first resource pool comprises a CCE.

In one embodiment, any resource group in the first resource pool is a CCE.

In one embodiment, any resource group in the first resource pool is an REG.

In one embodiment, any resource group in the first resource pool is a PDCCH candidate.

In one embodiment, any resource group in the first resource pool comprises more than one REG.

In one embodiment, any resource group in the first resource pool comprises 6 REGs.

In one embodiment, the first resource group occupies more than one RE in time-frequency domain.

In one embodiment, the first resource group occupies more than one PRB in frequency domain.

In one embodiment, the first resource group occupies a positive integer number of multi-carrier symbol(s) in time domain.

In one embodiment, the first resource group comprises a CCE.

In one embodiment, the first resource group is a CCE.

In one embodiment, the first resource group is an REG.

In one embodiment, the first resource group is a PDCCH candidate.

In one embodiment, the first resource group comprises 6 REGs.

In one embodiment, the first signaling comprises a physical layer signaling.

In one embodiment, the first signaling comprises a dynamic signaling.

In one embodiment, the first signaling comprises an L1 signaling.

In one embodiment, the first signaling comprises a L1 control signaling.

In one embodiment, the first signaling comprises DCI.

In one embodiment, the first signaling comprises one or more fields in a piece of DCI.

In one embodiment, the first signaling comprises one or more fields in one piece of SCI.

In one embodiment, the first signaling comprises DCI for DownLink Grant.

In one embodiment, the first signaling comprises DCI used for Semi-Persistent Scheduling Assignment activation.

In one embodiment, the first signaling comprises DCI used for indicating Semi-Persistent Scheduling release.

In one embodiment, the first signaling comprises a first field; a value of the first field in the first signaling, a first index and the first reference signal are used together for determining the first radio resource block.

In one embodiment, the first field is a PUCCH resource indicator field.

In one embodiment, the first field comprises all or part of information in a PUCCH resource indicator field.

In one embodiment, the first field comprises 3 bits.

In one embodiment, the first radio resource block comprises time-domain resources and frequency-domain resources.

In one embodiment, the first radio resource block comprises time-domain resources, frequency-domain resources and code-domain resources.

In one embodiment, the first radio resource block occupies more than one RE in time-frequency domain.

In one embodiment, the first radio resource block occupies a positive integer number of PRB(s) in frequency domain.

In one embodiment, the first radio resource block occupies a positive integer number of multi-carrier symbol(s) in time domain.

In one embodiment, the first radio resource block comprises Physical Uplink Control CHannel (PUCCH) resources.

In one embodiment, the first radio resource block comprises a PUCCH resource set.

In one embodiment, the first radio resource block is a PUCCH resource.

In one embodiment, the first signal comprises a baseband signal.

In one embodiment, the first signal comprises a radio signal.

In one embodiment, the first signal comprises a radio-frequency signal.

In one embodiment, the first signal carries Uplink Control Information (UCI).

In one embodiment, the first signal carries HARQ-ACK information.

In one embodiment, the first signal carries Scheduling Request (SR) information.

In one embodiment, the first signal carries Channel-State Information (CSI).

In one embodiment, the first signal indicates whether the first signaling is correctly received.

In one embodiment, the reference signal transmitted in any resource group comprised in the first resource pool comprises a demodulation reference signal.

In one embodiment, the reference signal transmitted in any resource group comprised in the first resource pool comprises a DMRS.

In one embodiment, the reference signal transmitted in any resource group comprised in the first resource pool comprises an SSB.

In one embodiment, the reference signal transmitted in any resource group comprised in the first resource pool comprises a CSI-RS.

In one embodiment, the reference signal transmitted in any resource group comprised in the first resource pool is different from any of the M reference signals.

In one embodiment, radio resources occupied by the reference signal transmitted in any resource group comprised in the first resource pool and any of the M reference signals are different.

In one embodiment, the reference signal transmitted in any resource group comprised in the first resource pool and any of the M reference signals are transmitted by different antenna ports.

In one embodiment, the reference signal transmitted in any resource group comprised in the first resource pool is spatially related to one and only one of the M reference signals.

In one embodiment, the first resource pool comprises M resource groups, and reference signals transmitted in the M resource groups are respectively and spatially related to the M reference signals.

In one embodiment, the first resource pool comprises more than one resource set, and the first resource set is a resource set in the first resource pool; any resource set in the first resource pool comprises a positive integer number of resource group(s).

In one subembodiment of the above embodiment, there exist numbers of resource groups comprised in two resource sets in the first resource pool being unequal.

In one subembodiment of the above embodiment, there exist numbers of resource groups comprised in two resource sets in the first resource pool being equal.

In one subembodiment of the above embodiment, there exist a number of resource group comprised in a resource set in the first resource pool being equal to 1.

In one subembodiment of the above embodiment, there exist a number of resource groups comprised in a resource set in the first resource pool being greater than 1.

In one subembodiment of the above embodiment, any resource set in the first resource pool comprises a PDCCH candidate.

In one subembodiment of the above embodiment, any resource set in the first resource pool is a PDCCH candidate.

In one subembodiment of the above embodiment, there exists a resource set in the first resource pool comprising M resource groups, and reference signals transmitted in the M resource groups are respectively and spatially related to the M reference signals.

In one subembodiment of the above embodiment, for any given resource set in the first resource pool, if a number of resource groups comprised in the given resource set is greater than 1, the given resource set comprises 2 resource groups, and reference signals transmitted in the two resource groups are respectively and spatially related to two different reference signals in the M reference signals.

In one subembodiment of the above embodiment, for any given resource set in the first resource pool, if a number of resource groups comprised in the given resource set not less than the M, the given resource set comprises M resource groups, and reference signals transmitted in the M resource groups are respectively and spatially related to the M reference signals.

In one embodiment, the first index is a non-negative integer.

In one embodiment, the first index is an index of the first resource group in the first resource pool.

In one embodiment, all resource groups comprised in the first resource pool are indexed in order in the first resource pool, and the first index is an index of the first resource group in the first resource pool.

In one embodiment, the first index is a CCE index.

In one embodiment, the first index is an REG index.

In one embodiment, the first index is an index of a PDCCH candidate.

In one embodiment, the first index is an index of the first resource group in a CORESET to which it belongs.

In one embodiment, the first index is an index of the first resource group in a search space set to which it belongs.

In one embodiment, the first index is an index of the first resource group in a PDCCH candidate to which it belongs.

In one embodiment, the first information block indicates the M reference signals in order, and indexes of the first index and the first reference signal in the M reference signals are used together for determining the first radio resource block.

Embodiment 18

Embodiment 18 illustrates a flowchart of wireless communications according to one embodiment in the present disclosure, as shown in FIG. 18. In FIG. 18, a second node U3 and a first node U4 are communication nodes transmitted via an air interface. In FIG. 18, steps in F181 and F184 are respectively optional.

The second node U3 transmits a second information block in step S18301; transmits a first information block in step S1831; transmits a first reference signal subset in step S18302; receives a second reference signal subset in step S18303; transmits a first signaling in a first resource pool in step S1832; transmits a second signal in step S18304; receives a first signal in a first radio resource block in step S1833.

The first node U4 receives a second information block in step S18401; receives a first information block in step S1841; receives a first reference signal subset in step S18402; transmits a second reference signal subset in step S18403; receives a first signaling in a first resource pool in step S1842; receives a second signal in step S18404; and transmits a first signal in a first radio resource block in step S1843.

In Embodiment 18, the first information block is used by the first node U4 for determining the first resource pool and M reference signals, M being a positive integer greater than 1; the first signaling is used by the first node U4 for determining the first radio resource block; the first resource pool comprises more than one resource group; the first signaling occupies a first resource set, the first resource set comprises a positive integer number of resource group(s), and any resource group in the first resource set belongs to the first resource pool; a reference signal transmitted in any resource group comprised in the first resource pool is spatially related to one of the M reference signals; a first resource group is a resource group in the first resource set, and a reference signal transmitted in the first resource group is spatially related to a first reference signal in the M reference signals; the first resource group is used by the first node U4 for determining a first index, and the first index and the first reference signal are used together by the first node U4 for determining the first radio resource block.

In one embodiment, the first node U4 is the first node in the present disclosure.

In one embodiment, the second node U3 is the second node in the present disclosure.

In one embodiment, an air interface between the second node U3 and the first node U4 comprises a radio interface between a base station and a UE.

In one embodiment, an air interface between the second node U3 and the first node U4 comprises a radio interface between UEs.

In one embodiment, the first information block is transmitted on a downlink physical layer data channel (i.e., a downlink channel capable of carrying physical layer data).

In one embodiment, the first information block is transmitted on a PDSCH.

In one embodiment, the first information block is transmitted on a PSSCH.

In one embodiment, the first signaling is transmitted on a downlink physical layer control channel (i.e., a downlink channel that is only capable of carrying a physical layer signaling).

In one embodiment, the first signaling is transmitted on a PDCCH.

In one embodiment, the first signaling is transmitted on a PSCCH.

In one embodiment, the first signal is transmitted on an uplink physical layer control channel (that is, an uplink channel capable of carrying a physical layer signaling only).

In one embodiment, the first signal is transmitted on a PUCCH.

In one embodiment, steps in box F181 in FIG. 18 exist; the second information block is used by the first node U4 for determining M resource group sets; the M resource group sets respectively correspond to the M reference signals, and any resource group in the first resource pool belongs to one of M resource group sets; the first resource group belongs to a first resource group set in the M resource group sets, and the first reference signal is a reference signal corresponding to the first resource group set in the M reference signals.

In one embodiment, the second information block is transmitted on a PDSCH.

In one embodiment, the second information block is transmitted on multiple PDSCHs.

In one embodiment, the second information block is transmitted on a PSSCH.

In one embodiment, steps in box F181 in FIG. 18 exist.

In one embodiment, steps in box F182 in FIG. 18 exist; and the first reference signal subset comprises one or more reference signals in the M reference signals.

In one embodiment, any reference signal in the first reference signal subset is a CSI-RS or an SSB.

In one embodiment, steps in box F183 in FIG. 18 exist; and the second reference signal subset comprises one or more reference signals in the M reference signals.

In one embodiment, any reference signal in the second reference signal subset is an SRS.

In one embodiment, there does not exist one of the M reference signals that belongs to the first reference signal subset and the second reference signal subset simultaneously.

In one embodiment, the M reference signals consist of the first reference signal subset and the second reference signal subset.

In one embodiment, steps in box F182 in FIG. 18 exist; while steps in box F183 do not exist.

In one embodiment, steps in box F182 in FIG. 18 do not exist; while steps in box F183 exist.

In one embodiment, steps in boxes F182 and F183 in FIG. 18 exist.

In one embodiment, steps in boxes F182 and F183 in FIG. 18 do not exist.

In one embodiment, steps in box F184 in FIG. 18 exist; the first signaling indicates scheduling information of the second signal; and the second signal carries a second bit block, and the first signal indicates whether the second bit block is correctly received.

In one embodiment, the second signal is transmitted on a PDSCH.

In one embodiment, the second signal is transmitted on a PSSCH.

In one embodiment, steps in box F184 in FIG. 18 exist.

Embodiment 19

Embodiment 19 illustrates a schematic diagram of a first information block according to one embodiment of the present disclosure, as shown in FIG. 19. In Embodiment 19, the first information block is used for determining the first resource pool and the M reference signals.

In one embodiment, the first information block indicates the first resource pool.

In one embodiment, the first information block indicates configuration information of the first resource pool.

In one embodiment, the configuration information of the first resource pool comprises one or more of occupied time-domain resources, frequency-domain resources, code-domain resources, a DMRS scrambling sequence, a CCE-to-REG mapping type, a CCE aggregation level, a PDCCH candidate number, a search space type or a PDCCH format.

In one embodiment, the first information block explicitly indicates configuration information of the first resource pool.

In one embodiment, the first information block implicitly indicates configuration information of the first resource pool.

In one embodiment, the first information block explicitly indicates part of configuration information of the first resource pool, and implicitly indicates other part of configuration information of the first resource pool.

In one embodiment, the first information block explicitly indicates the M reference signals.

In one embodiment, the first information block implicitly indicates the M reference signals.

In one embodiment, the first information block indicates the M reference signals in order.

In one embodiment, the first information block indicates identities of the M reference signals in order.

In one embodiment, the M reference signals are indexed in order.

In one embodiment, the first information block respectively indicates QCL types corresponding to the M reference signals.

In one embodiment, QCL types corresponding to the M reference signals are all QCL-TypeDs.

In one embodiment, the M reference signals comprise an SRS.

In one embodiment, the M reference signals comprise a CSI-RS.

In one embodiment, the M reference signals comprise an SSB.

In one embodiment, any reference signal in the M reference signals is an SRS, a CSI-RS or an SSB.

In one embodiment, any two of the M reference signals cannot be assumed to be QCLed.

In one embodiment, any two of the M reference signals cannot be assumed to be QCLed corresponding to QCL-TypeD.

In one embodiment, any two of the M reference signals cannot be assumed to be spatially related.

In one embodiment, the first information block indicates M TCI states, and the M TCI states respectively indicate the M reference signals.

In one subembodiment of the above embodiment, any of the M TCI states is an activated TCI state corresponding to the first resource pool.

In one subembodiment of the above embodiment, the M TCI states respectively indicate QCL types corresponding to the M reference signals, and the QCL types corresponding to the M reference signals are all QCL-TypeDs.

In one subembodiment of the above embodiment, the first information block respectively indicates TCI-StateIds corresponding to M TCI states.

In one subembodiment of the above embodiment, the first information block indicates the M TCI states in order.

In one embodiment, the first resource pool corresponds to M activated TCI states simultaneously.

In one embodiment, the first information block indicates that the first resource pool corresponds to M activated TCI states simultaneously.

In one embodiment, the first information block comprises a first information sub-block and a second information sub-block, the first information sub-block indicates M0 TCI states, M0 being a positive integer greater than the M; the second information sub-block indicates M TCI states out of the M0 TCI states, and the M TCI states respectively indicate the M reference signals.

In one subembodiment of the above embodiment, the first information sub-block is carried by an RRC signaling.

In one subembodiment of the above embodiment, the second information sub-block is carried by a MAC CE signaling.

In one subembodiment of the above embodiment, the second information sub-block activates the M TCI states out of the M0 TCI states.

Embodiment 20

Embodiment 20 illustrates a schematic diagram of a first given reference signal being spatially related to a second given reference signal according to one embodiment of the present disclosure, as shown in FIG. 20. In Embodiment 20, the first given reference signal is the reference signal transmitted in any resource group comprised in the first resource pool, the second given reference signal is one of the M reference signals, and the first given reference signal is spatially related to the second given reference signal.

In one embodiment, the being spatially related includes being QCL.

In one embodiment, the being spatially related includes being QCL and corresponding to QCL-TypeA.

In one embodiment, the being spatially related includes being QCL and corresponding to QCL-TypeB.

In one embodiment, the being spatially related includes being QCL and corresponding to QCL-TypeC.

In one embodiment, the being spatially related includes being QCL and corresponding to QCL-TypeD.

In one embodiment, the phrase that a first given reference signal is spatially related to a second given reference signal includes that a transmitting antenna port of the first given reference signal and a transmitting antenna port of the second given reference signal are QCL.

In one embodiment, the phrase that a first given reference signal is spatially related to a second given reference signal includes that a transmitting antenna port of the first given reference signal and a transmitting antenna port of the second given reference signal are QCL and corresponds to QCL-TypeD.

In one embodiment, the phrase that a first given reference signal is spatially related to a second given reference signal includes that the second given reference signal is used for determining large-scale properties of a channel over which the first given reference signal is conveyed.

In one embodiment, the phrase that a first given reference signal is spatially related to a second given reference signal includes that large-scale properties of a channel over which the second given reference signal is conveyed can be used for inferring large-scale properties of a channel over which the first given reference signal is conveyed.

In one embodiment, the large-scale properties include one or more of delay spread, Doppler spread, Doppler shift, average delay, and Spatial Rx parameters.

In one embodiment, the phrase that a first given reference signal is spatially related to a second given reference signal includes that the first node uses a same spatial receive parameter for receiving the first given reference signal and the second given reference signal.

In one embodiment, the phrase that a first given reference signal is spatially related to a second given reference signal includes that the second given reference signal is used for determining a spatial domain filter of the first given reference signal.

In one embodiment, the phrase that a first given reference signal is spatially related to a second given reference signal includes that the first node uses a same spatial domain filter for receiving the first given reference signal and the second given reference signal.

In one embodiment, the phrase that a first given reference signal is spatially related to a second given reference signal includes that the first node uses a same spatial filter for receiving the first given reference signal and transmitting the second given reference signal.

Embodiment 21

Embodiment 21 illustrates a schematic diagram of a second resource group, a second reference signal and a first value according to one embodiment of the present disclosure, as shown in FIG. 21. In Embodiment 12, any resource group in the first resource pool corresponds to a first-type value; the second resource group is any resource group in the first resource pool, and a reference signal transmitted in the second resource group is spatially related to the second reference signal; the first value is a first-type value corresponding to the second resource group, and the first value is used by the first node for determining the second reference signal out of the M reference signals.

In one embodiment, the first index is equal to a first-type value corresponding to the first resource group.

In one embodiment, the first index is unequal to a first-type value corresponding to the first resource group.

In one embodiment, the first-type value is a non-negative integer.

In one embodiment, the first value is used for determining an identity of the second reference signal.

In one embodiment, the first value is used for determining an index of the second reference signal in the M reference signals.

In one embodiment, the first value is an index of the second resource group in the first resource pool.

In one embodiment, the first value is an index of the second resource group in all resource groups comprised in the first resource pool.

In one embodiment, a first-type value corresponding to any given resource group in the first resource pool is an index of the given resource group in the first resource pool.

In one embodiment, a first-type value corresponding to any given resource group in the first resource pool is an index of the given resource group in all resource groups comprised in the first resource pool.

In one embodiment, all resource groups comprised in the first resource pool are indexed in order in the first resource pool.

In one embodiment, the first-type value is a CCE index.

In one embodiment, the first-type value is an index of a CCE in a CORESET to which it belongs.

In one embodiment, the first-type value is an REG index.

In one embodiment, the first-type value is an index of an REG in a CORESET to which it belongs.

In one embodiment, the first-type value is an index of a CCE in a PDCCH candidate to which it belongs.

In one embodiment, the first-type value is an index of a PDCCH candidate.

In one embodiment, the second resource group is a resource group in a second resource set, and the second resource set is a resource set in the first resource pool; the first value is an index of the second resource group in the second resource set.

In one subembodiment of the above embodiment, the second resource set only comprises one resource group, and the first value is equal to 0.

In one subembodiment of the above embodiment, the second resource set comprises multiple resource groups, the multiple resource groups are indexed in order in the second resource set, and the first value is an index of the second resource group in the multiple resource group.

In one embodiment, the second resource group is a resource group in a second resource set, and the second resource set is a resource set in the first resource pool; the first value is an index of the second resource set in a first resource sub-pool, and the first resource sub-pool consists of resource sets in which a number of all resource groups comprised in the first resource pool is equal to a number of resource groups comprised in the second resource set.

In one embodiment, all resource sets comprised in the first resource pool are indexed in order.

In one embodiment, first-type values corresponding to any two different resource groups in the first resource pool are unequal.

In one embodiment, there exist first-type values corresponding to two different resource groups in the first resource pool being equal.

In one embodiment, the first value and the M are used together for generating a first integer, and the first integer is used for determining the second reference signal.

In one subembodiment of the above embodiment, the first integer is an integer obtained by the first value modulo the M.

In one subembodiment of the above embodiment, the first integer is obtained by the first value divided by a second integer and then rounded up to a nearest integer, and the second integer is obtained by a total number of resource groups comprised in the first resource pool divided by the M and then rounded to a nearest integer.

In one subembodiment of the above embodiment, the first information block indicates the M reference signals in order, and an index of the second reference signal in the M reference signals is equal to the first integer.

In one subembodiment of the above embodiment, the first information block indicates the M reference signals in order, and an index of the second reference signal in the M reference signals is equal to the first integer minus 1.

In one subembodiment of the above embodiment, the first information block indicates the M reference signals in order, and an index of the second reference signal in the M reference signals is equal to the first integer plus 1 and then modulo the M.

In one embodiment, the rounded to a nearest integer includes rounded up.

In one embodiment, the rounded to a nearest integer includes rounded down.

In one embodiment, the M reference signals respectively correspond to M integer sets, and the first value belongs to a target integer set in the M integer sets; the second reference signal is a reference signal corresponding to the target integer set in the M reference signals; the M integer sets respectively comprise a positive integer number of non-negative integer(s), and there does not exist a non-negative integer that belongs to two different integer sets in the M integer sets simultaneously.

In one subembodiment of the above embodiment, the M integer sets are generated according to a pre-defined rule.

In one subembodiment of the above embodiment, the M integer sets are pre-defined.

In one subembodiment of the above embodiment, the M integer sets are configured by an RRC signaling.

Embodiment 22

Embodiment 22 illustrates a schematic diagram of a second resource group, a second reference signal and a first value according to one embodiment of the present disclosure, as shown in FIG. 22. In Embodiment 22, the second resource group is a resource group in a second resource set, and the second resource set is a resource set in the first resource pool; the second resource set is used for determining a second index, a third index is an index of the second resource group in the second resource set; and the second index and the third index are used together for determining the first value.

In one embodiment, the second resource set only comprises one resource group.

In one embodiment, the second resource set comprises multiple resource groups, and the second resource group is any resource group in the second resource set.

In one embodiment, the second index and the third index are respectively non-negative integers.

In one embodiment, the second index is an index of a PDCCH candidate.

In one embodiment, the third index is an index of a CCE in a PDCCH candidate to which it belongs.

In one embodiment, the second index is an index of the second resource set in the first resource pool.

In one embodiment, all resource sets in the first resource pool are indexed in order in the first resource pool.

In one embodiment, the first resource pool comprises a first resource sub-pool, the first resource sub-pool comprises a positive integer number of resource set(s), the first resource sub-pool comprises the second resource set, and a number of resource groups comprised in any resource set in the first resource sub-pool is equal to a number of resource groups comprised in the second resource set; the second index is an index of second resource set in the first resource sub-pool.

In one subembodiment of the above embodiment, the first resource sub-pool consists of resource sets in which a number of all resource groups comprised in the first resource pool is equal to a number of resource groups comprised in the second resource set.

In one subembodiment of the above embodiment, the first resource sub-pool only comprises the second resource set, and the second index is equal to 0.

In one subembodiment of the above embodiment, the first resource sub-pool comprises multiple resource sets, the multiple resource sets in the first resource sub-pool are indexed in order, and the second index is an index of the second resource set in the multiple resource sets.

In one embodiment, the second resource set only comprises one resource group, and the third index is equal to 0.

In one embodiment, the second resource set comprises multiple resource groups, the multiple resource groups are indexed in order in the second resource set, and the third index is an index of the second resource group in the multiple resource groups.

In one embodiment, a sum of the second index and the third index is used for determining the first value.

In one embodiment, the first value is equal to a sum of the second index and the third index.

In one embodiment, the first value is equal to a product of the second index and a number of resource groups comprised in the second resource set then plus the third index.

In one embodiment, the first value is equal to a product of a sum of the second index plus 1 multiplied by a sum of the third index plus 1.

Embodiment 23

Embodiment 23 illustrates a schematic diagram of a second information block according to one embodiment of the present disclosure, as shown in FIG. 23. In Embodiment 23, the second information block is used for determining the M resource group sets.

In one embodiment, the second information block is carried by a higher-layer signaling.

In one embodiment, the second information block is carried by an RRC signaling.

In one embodiment, the second information block is carried by a MAC CE signaling.

In one embodiment, the second information block is carried by an RRC signaling and a MAC CE together.

In one embodiment, the second information block comprises information in all or partial fields in an IE.

In one embodiment, the second information block comprises information in all or partial fields in a PDCCH-Config IE.

In one embodiment, the second information block comprises all or partial information in a controlResourceSet-ToAddModList field in a PDCCH-Config IE.

In one embodiment, the second information block comprises all or partial information in a searchSpacesToAddModList field in a PDCCH-Config IE.

In one embodiment, the second information block indicates the M resource group sets.

In one embodiment, the second information block indicates configuration information in each resource group set in the M resource group sets.

In one embodiment, the configuration information of any of the M resource group sets comprises one or more of code-domain resources, frequency-domain resources, code-domain resources, a DMRS scrambling sequence or a CCE-to-REG mapping type.

In one embodiment, the second information block indicates corresponding relations among the M resource group sets and the M reference signals.

In one embodiment, the second information block indicates QCL types corresponding to the M reference signals.

In one embodiment, the second information block respectively indicates M TCI states, and the M TCI states respectively indicate the M reference signals.

In one embodiment, the M TCI states respectively indicate QCL types corresponding to the M reference signals.

In one embodiment, the second information block comprises M information sub-blocks, and the M information sub-blocks are respectively used for determining the M resource group sets.

In one subembodiment of the above embodiment, the M information sub-blocks respectively indicate the M TCI states.

In one subembodiment of the above embodiment, a given information sub-block is one of the M information sub-blocks, and the given information sub-block is used for determining a given resource group set in the M resource group sets; the given information sub-block indicates S TCI states, S being a positive integer greater than 1; a third information block is used for activating a given TCI state out of the S TCI states, the given TCI state indicates a given reference signal, and the given reference signal is a reference signal corresponding to the given resource group set in the M reference signals; and the third information block is carried by a MAC CE signaling.

In one embodiment, any of the M resource group sets comprises time-domain resources.

In one embodiment, any of the M resource group sets comprises frequency-domain resources.

In one embodiment, any of the M resource group sets comprises code-domain resources.

In one embodiment, any of the M resource group sets occupies a positive integer number of RE(s) in time-frequency domain.

In one embodiment, any of the M resource group sets occupies a positive integer number of subcarrier(s) in frequency domain.

In one embodiment, any of the M resource group sets occupies a positive integer number of PRB(s) in frequency domain.

In one embodiment, any of the M resource group sets occupies a positive integer number of multicarrier symbol(s) in time domain.

In one embodiment, any of the M resource group sets comprises a CORESET.

In one embodiment, any resource group set in the M resource group sets is a CORESET.

In one embodiment, any resource group set in the M resource group sets comprises a search space set.

In one embodiment, any resource group set in the M resource group sets is a search space set.

In one embodiment, any resource group set in the M resource group sets comprises more than one CCE.

In one embodiment, any resource group set in the M resource group sets comprises more than one REG.

In one embodiment, any resource group set in the M resource group sets comprises more than one resource group.

Embodiment 24

Figures 24, 25, 26, 27, 28, 29, 30, 31:
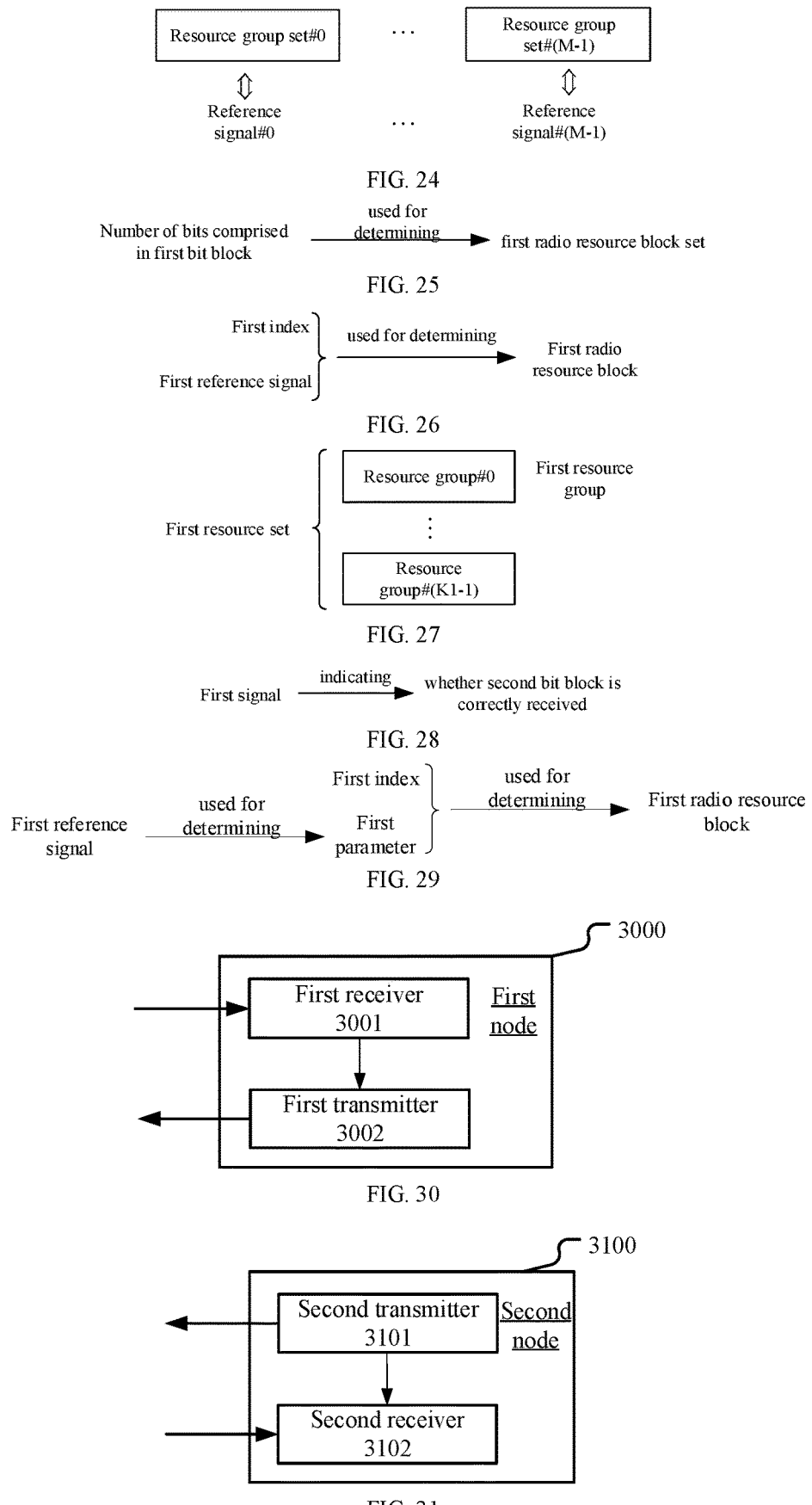
FIG. 24 illustrates a schematic diagram of M resource group sets and M reference signals according to one embodiment of the present disclosure.
FIG. 25 illustrates a schematic diagram of a number of bits comprised in a first bit block being used for determining a first radio resource block set according to one embodiment of the present disclosure.
FIG. 26 illustrates a schematic diagram of a first index and a first reference signal being used together for determining a first radio resource block according to one embodiment of the present disclosure.
FIG. 27 illustrates a schematic diagram of K1 resource group(s) and a first resource group according to one embodiment of the present disclosure.
FIG. 28 illustrates a schematic diagram of a first signal and a second bit block according to one embodiment of the present disclosure.
FIG. 29 illustrates a schematic diagram of a first index and a first reference signal being used together for determining a first radio resource block according to one embodiment of the present disclosure.
FIG. 30 illustrates a structure block diagram of a processing device in a first node according to one embodiment of the present disclosure.
FIG. 31 illustrates a structure block diagram of a processing device in a second node according to one embodiment of the present disclosure.

Embodiment 24 illustrates a schematic diagram of M resource group sets and M reference signals according to one embodiment of the present disclosure, as shown in FIG. 24. In Embodiment 24, the M resource group sets respectively correspond to the M reference signals. In FIG. 24, indexes of the M resource group sets and the M reference signals are respectively #0, . . . , #(M−1).

In one embodiment, the phrase that the M resource group sets respectively correspond to the M reference signals includes that DMRSs transmitted in the M resource group sets are respectively and spatially related to the M reference signals.

In one embodiment, the phrase that the M resource group sets respectively correspond to the M reference signals includes that M TCI states respectively indicate the M reference signals, and the M TCI states are respectively activated TCI states corresponding to the M resource group sets.

In one embodiment, any resource group set in the M resource group sets only corresponds to one reference signal.

In one embodiment, any resource group set in the M resource group sets only corresponds to one activated TCI state.

In one embodiment, a reference signal transmitted in any given resource group in the first resource pool is spatially related to a reference signal corresponding to a resource group set to which the given resource group belongs.

In one embodiment, the M resource group sets are arranged in order.

In one embodiment, the first information block indicates the M resource group sets.

In one embodiment, the first information block indicates the M resource group sets in order.

In one embodiment, the first information block indicates identities of the M resource group sets in order.

In one embodiment, identities of the M resource group sets comprise a ControlResourceSetId.

In one embodiment, identities of the M resource group sets comprise a SearchSpaceId.

In one embodiment, the first information block indicates that the first resource block is associated with each of the M resource group sets.

In one embodiment, an index of the first resource group set in the M resource group sets is equal to an index of the first reference signal in the M reference signals.

In one embodiment, the second resource group belongs to a second resource group set in the M resource group sets, and the second resource group is a resource group set in the M resource group sets corresponding to the second reference signal.

In one subembodiment of the above embodiment, an index of the second resource group set in the M resource group sets is equal to an index of the second reference signal in the M reference signals.

In one embodiment, M resource groups comprised in the first resource pool respectively belong to the M resource group sets.

In one embodiment, there exists a resource set in the first resource pool that comprises M resource groups, and the M resource groups respectively belong to the M resource group sets.

In one embodiment, for any given resource set in the first resource pool, if a number of resource groups comprised in the given resource set is greater than 1, there exist two resource groups in the given resource set that respectively belong to two different resource sets in the M resource group sets.

In one embodiment, for any given resource set in the first resource pool, if a number of resource groups comprised in the given resource set is not less than the M, there exist M resource groups in the given resource set that respectively belong to the M resource group sets.

In one embodiment, the first index is an index of the first resource group in the first resource group set.

In one embodiment, the first index is a non-negative integer less than a number of resource groups comprised in the first resource group set.

In one embodiment, all resource groups comprised in any resource group set in the M resource group sets are indexed in order.

In one embodiment, the first index is an index in all resource groups comprised in the first resource group.

Embodiment 25

Embodiment 25 illustrates a schematic diagram of a number of bits comprised in a first bit block being used for determining a first radio resource block set according to one embodiment of the present disclosure, as shown in FIG. 25.

In one embodiment, a number of bits comprised in the first bit block is used by the first node for determining the first radio resource block set.

In one embodiment, a number of bits comprised in the first bit block is used by the second node for determining the first radio resource block set.

In one embodiment, the first bit block comprises UCI.

In one embodiment, the first bit block comprises HARQ-ACK.

In one embodiment, the first bit block comprises SR.

In one embodiment, the first bit block comprises CSI.

In one embodiment, the first bit block comprises more than one bit.

In one embodiment, all bits in the first bit block are arranged in order.

In one embodiment, the phrase that the first signal carries a first bit block includes that the first signal is an output of bits in the first bit block sequentially through Sequence Generation, Resource Element Mapping, Generation of Multicarrier Symbol, and Modulation and Upconversion.

In one embodiment, the phrase that the first signal carries a first bit block includes that the first signal is an output of bits in the first bit block sequentially through Sequence Modulation, Resource Element Mapping, Generation of Multicarrier Symbol, and Modulation and Upconversion.

In one embodiment, the phrase that the first signal carries a first bit block includes that the first signal is an output of bits in the first bit block sequentially through CRC Attachment, Channel Coding, Rate Matching, Scrambling, Modulation, Sreading, Resource Element Mapping, Generation of Multicarrier Symbol, and Modulation and Upconversion.

In one embodiment, the phrase that the first signal carries a first bit block includes that the first signal is an output of bits in the first bit block sequentially through CRC Attachment, Channel Coding, Rate Matching, Scrambling, Modulation, Sreading, Transform Precoder, Resource Element Mapping, Generation of Multicarrier Symbol, and Modulation and Upconversion.

In one embodiment, the phrase that the first signal carries a first bit block includes that the first bit block is used for generating the first signal.

In one embodiment, the first radio resource block set comprises more than one radio resource block, and the first radio resource block is a radio resource block comprised in the first radio resource block set.

In one embodiment, a number of radio resource blocks comprised in the first radio resource block set is greater than 8.

In one embodiment, a number of radio resource blocks comprised in the first radio resource block set is greater than a power of a first bit number of 2, and the first bit number is a bit number comprised in the first field in the first signaling.

In one embodiment, any radio resource block in the first radio resource block set comprises time-domain resources and frequency-domain resources.

In one embodiment, any radio resource block in the first radio resource block set comprises time-frequency resources and code-domain resources.

In one embodiment, any resource block in the first radio resource block set occupies a positive integer number of RE(s) in time-frequency domain.

In one embodiment, any radio resource block in the first radio resource block set comprises PUCCH resources.

In one embodiment, any radio resource block in the first radio resource block set is a PUCCH resource.

In one embodiment, the first radio resource block set comprises a PUCCH resource set.

In one embodiment, the first radio resource block set is a PUCCH resource set.

In one embodiment, the first radio resource block set is one of P candidate radio resource block sets, the P candidate radio resource block sets respectively correspond to P second-type values, and the P second-type values are respectively positive integers greater than 1; a target second value is a smallest second-type value in the P second-type values not less than a number of bits comprised in the first bit block, and the first radio resource block set is a candidate radio resource block set in the P candidate radio resource blocks corresponding to the target second-type value.

In one subembodiment of the above embodiment, the P second-type values are respectively maximum payload sizes that the P candidate radio resource block sets can carry.

Embodiment 26

Embodiment 26 illustrates a schematic diagram of a first index and a first reference signal being used together for determining a first radio resource block according to one embodiment of the present disclosure, as shown in FIG. 26.

In one embodiment, the first index and the first reference signal are used together by the first node for determining the first radio resource block out of the first radio resource block set.

In one embodiment, the first index and the first reference signal are used together by the second node for determining the first radio resource block out of the first radio resource block set.

In one embodiment, the first index and the first reference signal are used together for determining an index of the first radio resource block in the first radio resource block set.

In one embodiment, an index of the first radio resource block in the first radio resource block set is a non-negative integer less than a number of radio resource blocks comprised in the first radio resource block set.

In one embodiment, the first index and an identity of the first reference signal are used together for determining the first radio resource block out of the first radio resource block set.

In one embodiment, the first index and an index of the first reference signal in the M reference signals are used together for determining the first radio resource block out of the first radio resource block set.

In one embodiment, the first index and an identity of a TCI state corresponding to the first reference signal are used together for determining the first radio resource block out of the first radio resource block set.

In one embodiment, a value of the first field in the first signaling, the first index and the first reference signal are used together for determining the first radio resource block out of the first radio resource block set.

In one embodiment, the M reference signals respectively correspond to M radio resource block subsets, and a first radio resource block subset is a radio resource block subset corresponding to the first reference signal in the M radio resource block subsets; the first index is used for determining the first radio resource block out of the first radio resource block subset; and any of the M radio resource block subsets comprises part or all of radio resource blocks in the first radio resource block set.

In one subembodiment of the above embodiment, a value of the first field in the first signaling and the first index are used together for determining the first radio resource block out of the first radio resource block subset.

In one subembodiment of the above embodiment, an index of the first radio resource block in the first radio resource block subset is linearly related to a value of the first field in the first signaling.

In one subembodiment of the above embodiment, an index of the first radio resource block in the first radio resource block subset is linearly related a second reference integer, and the first index is used for determining the second reference integer.

In one subembodiment of the above embodiment, the second reference integer is equal to a second reference real number to be rounded to a nearest integer, and the second reference real number is linearly related to the first index.

In one subembodiment of the above embodiment, the second reference integer is equal to a second reference real number to be rounded to a nearest integer, the second reference real number is linearly related to a first ratio, and the first ratio is a ratio of the first index to a number of resource groups comprised in the first resource group set.

In one subembodiment of the above embodiment, there does not exist a radio resource block in the first radio resource block set that simultaneously belongs to two different radio resource block subsets in the M radio resource block subsets.

In one subembodiment of the above embodiment, there exists a radio resource block in the first radio resource block set that simultaneously belongs to two different radio resource block subsets in the M radio resource block subsets.

In one subembodiment of the above embodiment, the M radio resource block subsets are generated according to a predefined method.

In one subembodiment of the above embodiment, the M radio resource block subsets are configured by an RRC signaling.

Embodiment 27

Embodiment 27 illustrates a schematic diagram of K1 resource group(s) and a first resource group according to one embodiment of the present disclosure, as shown in FIG. 27. In Embodiment 27, the first resource set comprises the K1 resource groups, K1 being a positive integer greater than 1; and the first resource group is a first resource group in the K1 resource groups.

In one embodiment, the K1 is one of 2, 4, 8, or 16.

In one embodiment, the phrase that the first resource group is a first resource group in the K1 resource groups includes that the first signaling carries a third bit block, a symbol sequence generated by the third bit block is first mapped onto the first resource group, and then mapped onto resource groups other than the first resource group in the K1 resource groups.

In one subembodiment of the above embodiment, the third bit block comprises one or more fields in DCI.

In one subembodiment of the above embodiment, the symbol sequence generated by the third bit block is an output of all bits in the third bit block sequentially through CRC Attachment, Channel Coding, Rate Matching, Scrambling, Modulation and Sreading.

In one subembodiment of the above embodiment, the symbol sequence generated by the third bit block is an output of all bits in the third bit block sequentially through CRC Attachment, Channel Coding, Rate Matching, Scrambling, Modulation, Sreading and a Transform Precoder.

In one subembodiment of the above embodiment, the symbol sequence generated by the third bit block is a pseudo-random sequence generated according to a value of bits comprised in the third bit block.

In one subembodiment of the above embodiment, the symbol sequence generated by the third bit block is obtained by a product of a modulation symbol generated by a bit comprised in the third bit block multiplied by a pseudo-random sequence.

In one subembodiment of the above embodiment, the third bit block comprises one or more bits.

In one subembodiment of the above embodiment, the third bit block comprises multiple bits, and the multiple bits are arranged in order.

In one embodiment, the pseudo-random sequence comprises a low PAPR sequence.

In one embodiment, the pseudo-random sequence comprises a Zadoff-Chu sequence.

In one embodiment, the phrase that the first resource group is a first resource group in the K1 resource groups includes that an index of the first resource group in the K1 resource groups is less than an index of any resource group in the K1 resource groups other than the first resource group in the K1 resource groups.

In one embodiment, the phrase that the first resource group is a first resource group in the K1 resource groups includes that an index of the first resource group in the K1 resource groups is equal to 0.

In one embodiment, a third resource group is a resource group different from the first resource group in the K1 resource groups, and a reference signal transmitted in the third resource group is spatially related to one of the M reference signals different from the first reference signal.

In one embodiment, a third resource group is a resource group different from the first resource group in the K1 resource groups, and the third resource group belongs to a resource group set different from the first resource group set in the M resource group sets.

Embodiment 28

Embodiment 28 illustrates a schematic diagram of a first signal and a second bit block according to one embodiment of the present disclosure, as shown in FIG. 28. In Embodiment 28, the first signaling indicates scheduling information of the second signal; the second signal carries the second bit block, and the first signal indicates whether the second bit block is correctly received.

In one embodiment, the scheduling information of the second signal comprises occupied time-domain resources, frequency-domain resources, a MCS, a DMRS port, a HARQ process number, an RV or an NDI.

In one embodiment, the second signal comprises a baseband signal.

In one embodiment, the second signal comprises a radio signal.

In one embodiment, the second signal comprises a radio-frequency signal.

In one embodiment, the second bit block comprises a Transport Block (TB).

In one embodiment, the second bit block comprises a Code Block (CB).

In one embodiment, the second bit block comprises a Code Block Group (CBG).

In one embodiment, the phrase that the second signal carries a second bit block includes that the second signal is an output of bits in the second bit block sequentially through CRC Attachment, Segmentation, CB level CRC Attachment, channel coding, rate matching, Concatenation, Scrambling, a Modulation Mapper, a Layer Mapper, Precoding, a Resource Element Mapper, Generation of multicarrier symbol, and Modulation and Upconversion.

In one embodiment, the phrase that the second signal carries a second bit block includes that the second signal is an output of bits in the second bit block sequentially through CRC Attachment, channel coding, rate matching, a Modulation Mapper, a Layer Mapper, Precoding, a Resource Element Mapper, Generation of multicarrier symbol, and Modulation and Upconversion.

In one embodiment, the phrase that the second signal carries a second bit block includes that the second bit block is used for generating the second signal.

In one embodiment, the first signal indicates whether the second signal is correctly received.

In one embodiment, the first signal carries a HARQ-ACK indicator corresponding to the second signal.

In one embodiment, the second signal is transmitted on a PDSCH.

In one embodiment, the second signal is transmitted on a PSSCH.

Embodiment 29

Embodiment 29 illustrates a schematic diagram of a first index and a first reference signal being used together for determining a first radio resource block according to one embodiment of the present disclosure, as shown in FIG. 29. In Embodiment 29, the first reference signal is used by the first node for determining the first parameter; the first index and the first parameter are used together by the first node for determining the first radio resource block.

In one embodiment, a value of the first field in the first signaling, the first index and the first parameter are used together for determining the first radio resource block out of the first radio resource block set.

In one embodiment, a value of the first field in the first signaling, a value of the first index and a value of the first parameter are used together for calculating an index of the first radio resource block in the first radio resource block set.

In one embodiment, a value of the first field in the first signaling, a value of the first index and a value of the first parameter calculate an index of the first radio resource block in the first radio resource block set through a predefined formula.

In one embodiment, the first parameter is a non-negative integer.

In one embodiment, the first parameter is an index of the first reference signal in the M reference signals.

In one embodiment, the first parameter is an identity of the first reference signal.

In one embodiment, the first parameter is an identity of a TCI state corresponding to the first reference signal.

In one embodiment, a position of the first reference signal in the M reference signals is used for determining the first parameter.

In one embodiment, the M reference signals respectively correspond to M first-type parameters; and the first parameter is a first-type parameter in the M first-type parameters corresponding to the first reference signal.

In one subembodiment of the above embodiment, the M first-type parameters are configured by RRC.

In one subembodiment of the above embodiment, the M first-type parameters are pre-defined.

In one subembodiment of the above embodiment, the second information block is used for determining the M first-type parameters.

In one embodiment, numbers of resource groups comprised in the M resource group sets are respectively M second-type integers; a position of the first reference signal in the M reference signals and the M second-type integers are used together for determining the first parameter.

In one embodiment, when a resource group set corresponding to the first reference signal is a first resource group set in the M resource group sets, the first parameter is equal to 0; when a resource group set corresponding to the first reference signal is a second resource group set in the M resource group sets, the first parameter is equal to a second-type integer corresponding to a first resource group set in the M resource group sets; when a resource group set corresponding to the first reference signal is neither a first resource group set in the M resource group sets nor a second resource group set in the M resource group sets, the first parameter is a sum of second-type integers corresponding to M1 resource group sets, M1 being a positive integer greater than 1 and less than the M, and the M1 resource group sets consists of all resource group sets arranged before a resource group set corresponding to the first reference signal in the M resource group sets.

In one embodiment, a target index is an index of the first radio resource block in the first radio resource block set, and a first reference integer is a value of the first field in the first signaling; the target index is respectively and linearly related to the first reference integer and a second reference integer, a linear coefficient between the target index and the first reference integer is equal to the third reference integer, and a linear coefficient between the target index and the second reference integer is equal to 1; the first index and the first parameter are used for determining the second reference integer; and a number of radio resource blocks comprised in the first radio resource block set is used for determining the third reference integer.

In one subembodiment of the above embodiment, the second reference integer is equal to a second reference real number to be rounded to a nearest integer, and the second reference real number is linearly related to a sum of the first index and the first parameter.

In one subembodiment of the above embodiment, the second reference integer is equal to a second reference real number to be rounded to a nearest integer, and the second reference real number is respectively and linearly related to the first index and the first parameter.

In one subembodiment of the above embodiment, the second reference integer is equal to a second reference real number to be rounded to a nearest integer, the second reference real number is equal to a product of a fourth reference real number multiplied by the third reference integer, and the fourth reference integer is equal to a sum of the first index and the first parameter divided by a sum of the M second-type integers.

In one subembodiment of the above embodiment, the first reference integer is used for determining the third reference integer.

In one subembodiment of the above embodiment, the third reference integer is obtained by a number of radio resource blocks comprised in the first radio resource block set divided by 8 and then rounded to a nearest integer, and the first reference integer is used for determining whether the rounded is rounded up or rounded down.

In one subembodiment of the above embodiment, the target index is linearly related to a fifth reference integer, a linear coefficient between the target index and the fifth reference integer is equal to 1, and the fifth reference integer is equal to a number of radio resource blocks comprised in the first radio resource block set modulo 8.

Embodiment 30

Embodiment 30 illustrates a structure block diagram of a processing device in a first node according to one embodiment of the present disclosure, as shown in FIG. 30. In FIG. 30, a first node's processing device 3000 comprises a first receiver 3001 and a first transmitter 3002.

In Embodiment 30, the first receiver 3001 receives a first information block and receives a first signaling in a first resource pool; and the first transmitter 3002 transmits a first signal in a first radio resource block.

In Embodiment 30, the first information block is used for determining the first resource pool and M reference signals, M being a positive integer greater than 1; the first signaling is used for determining the first radio resource block; the first resource pool comprises more than one resource group; the first signaling occupies a first resource set, the first resource set comprises a positive integer number of resource group(s), and any resource group in the first resource set belongs to the first resource pool; a reference signal transmitted in any resource group comprised in the first resource pool is spatially related to one of the M reference signals; a first resource group is a resource group in the first resource set, and a reference signal transmitted in the first resource group is spatially related to a first reference signal in the M reference signals; the first resource group is used for determining a first index, and the first index and the first reference signal are used together for determining the first radio resource block.

In one embodiment, any resource group in the first resource pool corresponds to a first-type value; a second resource group is any resource group in the first resource pool, and a reference signal transmitted in the second resource group is spatially related to a second reference signal in the M reference signals; a first value is a first-type value corresponding to the second resource group, and the first value is used for determining the second reference signal out of the M reference signals.

In one embodiment, the first receiver 3001 receives a second information block; herein, the second information block is used for determining M resource group sets; the M resource group sets respectively correspond to the M reference signals, and any resource group in the first resource pool belongs to one of M resource group sets; the first resource group belongs to a first resource group set in the M resource group sets, and the first reference signal is a reference signal corresponding to the first resource group set in the M reference signals.

In one embodiment, the first signal carries a first bit block, a number of bits comprised in the first bit block is used for determining a first radio resource block set, and the first radio resource block belongs to the first radio resource block set; the first index and the first reference signal are used together for determining the first radio resource block out of the first radio resource block set.

In one embodiment, when the first resource set comprises K1 resource groups and K1 is a positive integer number greater than 1, the first resource group is a first resource group in the K1 resource groups.

In one embodiment, the first receiver 3001 receives a second signal; herein, the first signaling indicates scheduling information of the second signal; the second signal carries a second bit block, and the first signal indicates whether the second bit block is correctly received.

In one embodiment, the first reference signal is used for determining a first parameter; the first index and the first parameter are used together for determining the first radio resource block.

In one embodiment, the first node is a UE.

In one embodiment, the first node is a relay node.

In one embodiment, the first receiver 3001 comprises at least one of the antenna 452, the receiver 454, the receiving processor 456, the multi-antenna receiving processor 458, the controller/processor 459, the memory 460, or the data source 467 in Embodiment 4.

In one embodiment, the first transmitter 3002 comprises at least one of the antenna 452, the transmitter 454, the transmitting processor 468, the multi-antenna transmitting processor 457, the controller/processor 459, the memory 460, or the data source 467 in Embodiment 4.

Embodiment 31

Embodiment 31 illustrates a structure block diagram of a processing device in a second node according to one embodiment of the present disclosure, as shown in FIG. 31. In FIG. 31, a second node's processing device 3100 comprises a second transmitter 3103 and a second receiver 3102.

In Embodiment 31, the second transmitter 3101 transmits a first information block and transmits a first signaling in a first resource pool; and a second receiver 3102 receives a first signal in a first radio resource block.

In Embodiment 31, the first information block is used for determining the first resource pool and M reference signals, M being a positive integer greater than 1; the first signaling is used for determining the first radio resource block; the first resource pool comprises more than one resource group; the first signaling occupies a first resource set, the first resource set comprises a positive integer number of resource group(s), and any resource group in the first resource set belongs to the first resource pool; a reference signal transmitted in any resource group comprised in the first resource pool is spatially related to one of the M reference signals; a first resource group is a resource group in the first resource set, and a reference signal transmitted in the first resource group is spatially related to a first reference signal in the M reference signals; the first resource group is used for determining a first index, and the first index and the first reference signal are used together for determining the first radio resource block.

In one embodiment, any resource group in the first resource pool corresponds to a first-type value; a second resource group is any resource group in the first resource pool, and a reference signal transmitted in the second resource group is spatially related to a second reference signal in the M reference signals; a first value is a first-type value corresponding to the second resource group, and the first value is used for determining the second reference signal out of the M reference signals.

In one embodiment, the second transmitter 3101 transmits a second information block; herein, the second information block is used for determining M resource group sets; the M resource group sets respectively correspond to the M reference signals, and any resource group in the first resource pool belongs to one of M resource group sets; the first resource group belongs to a first resource group set in the M resource group sets, and the first reference signal is a reference signal corresponding to the first resource group set in the M reference signals.

In one embodiment, the first signal carries a first bit block, a number of bits comprised in the first bit block is used for determining a first radio resource block set, and the first radio resource block belongs to the first radio resource block set; the first index and the first reference signal are used together for determining the first radio resource block out of the first radio resource block set.

In one embodiment, when the first resource set comprises K1 resource groups and K1 is a positive integer number greater than 1, the first resource group is a first resource group in the K1 resource groups.

In one embodiment, the second transmitter 3101 transmits a second signal; herein, the first signaling indicates scheduling information of the second signal; the second signal carries a second bit block, and the first signal indicates whether the second bit block is correctly received.

In one embodiment, the first reference signal is used for determining a first parameter; the first index and the first parameter are used together for determining the first radio resource block.

In one embodiment, the second node is a base station.

In one embodiment, the second node is a UE.

In one embodiment, the second node is a relay node.

In one embodiment, the second transmitter 3101 comprises at least one of the antenna 420, the transmitter 418, the transmitting processor 416, the multi-antenna transmitting processor 471, the controller/processor 475, or the memory 476 in Embodiment 4.

In one embodiment, the second receiver 3102 comprises at least one of the antenna 420, the receiver 418, the receiving processor 470, the multi-antenna receiving processor 472, the controller/processor 475, or the memory 476 in Embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A user equipment (UE), comprising:
   a receiver configured to receive control information indicating a resource pool, wherein the resource pool includes a plurality of resource sets, and a sub-pool includes a portion of the plurality of resource sets, each resource set of the plurality of resource sets includes a plurality of resource groups, a resource group of the resource pool is part of one of a plurality of resource group subsets, a first resource set of the plurality of resource sets has a first index in the sub-pool, and a number of resource groups in each resource set of the plurality of resource sets is the same, a first resource group of the plurality of resource groups of the first resource set has a second index, and the first resource group belongs to a first resource group subset of the plurality of resource group subsets, and the first resource group subset is related to at least one of the first index or the second index, and the plurality of resource group subsets respectively correspond to a plurality of quasi-colocation spatial relations that indicate a respective plurality of reference signals,
   wherein the UE is configured to monitor the resource pool.

2. The UE according to claim 1, wherein on a condition that the number of resource groups in each resource set of the plurality of resource sets is equal to or greater than a number of the plurality of resource group subsets a resource group of the plurality resource groups belongs to a resource group subset of the plurality of resource group subsets.

3. The UE according to claim 2, wherein a number of resource groups of the first resource group subset in the first resource set is not equal to a number of resource groups of the first resource group subset in a second resource set.

4. The UE according to claim 1, wherein indices of resource groups in the first resource group subset are consecutive.

5. The UE according to claim 1, wherein the plurality of resource group subsets respectively correspond to a plurality of reference values, an index of the first resource group in the first resource group subset is related to a first reference value, and the first reference value is a reference value corresponding to the first resource group subset in the plurality of reference values.

6. The UE according to claim 1, wherein the plurality of resource group subsets respectively belong to a plurality of resource group sets, and the control information respectively indicates the plurality of resource group subsets out of the plurality of resource group sets.

7. A base station, comprising:
   a transmitter configured to transmit control information indicating a resource pool, wherein the resource pool includes a plurality of resource sets, and a sub-pool includes a portion of the plurality of resource sets, each resource set of the plurality of resource sets includes a plurality of resource groups, a resource group of the resource pool is part of one of a plurality of resource group subsets, a first resource set of the plurality of resource sets has a first index in the sub-pool, and a number of resource groups in each resource set of the plurality of resource sets is the same, a first resource group of the plurality of resource groups of the first resource set has a second index, and the first resource group belongs to a first resource group subset of the plurality of resource group subsets, and the first resource group subset is related to at least one of the first index or the second index, and the plurality of resource group subsets respectively correspond to a plurality of quasi-colocation spatial relations that indicate a respective plurality of reference signals,
   wherein the resource pool is monitored.

8. The base station according to claim 7, wherein on a condition that the number of resource groups in each resource set of the plurality of resource sets is equal to or greater than a number of the plurality of resource group subsets, a resource group of the plurality resource groups belongs to a resource group subset of the plurality of resource group subsets.

9. The base station according to claim 8, wherein a number of resource groups of the first resource group subset in the first resource set is not equal to a number of resource groups of the first resource group subset in a second resource set.

10. The base station according to claim 8, wherein resource groups in the first resource group subset are consecutive.

11. The base station according to claim 7, wherein the plurality of resource group subsets respectively correspond to a plurality of reference values, an index of the first resource group in the first resource group subset is related to a first reference value, and the first reference value is a reference value corresponding to the first resource group subset in the plurality of reference values.

12. The base station according to claim 7, wherein the plurality of resource group subsets respectively belong to a plurality of resource group sets, and the control information respectively indicates the plurality of resource group subsets out of the plurality of resource group sets.

13. A method, comprising:

receiving control information indicating a resource pool, wherein the resource pool includes a plurality of resource sets, and a sub-pool includes a portion of the plurality of resource sets, each resource set of the plurality of resource sets includes a plurality of resource groups, a resource group of the resource pool is part of one of a plurality of resource group subsets, a first resource set of the plurality of resource sets has a first index in the sub-pool, and a number of resource groups in each resource set of the plurality of resource sets is the same, a first resource group of the plurality of resource groups of the first resource set has a second index, and the first resource group belongs to a first resource group subset of the plurality of resource group subsets, and the first resource group subset is related to at least one of the first index or the second index, and the plurality of resource group subsets respectively correspond to a plurality of quasi-colocation spatial relations that indicate a respective plurality of reference signals; and monitoring the resource pool.

14. The method according to claim 13, wherein on a condition that the number of resource groups in each resource set of the plurality of resource sets is equal to or greater than a number of the plurality of resource group subsets, a resource group of the plurality resource groups belongs to a resource group subset of the plurality of resource group subsets.

15. The method according to claim 14, wherein a number of resource groups of the first resource group subset in the first resource set is not equal to a number of resource groups of the first resource group subset in a second resource set.

16. The method according to claim 13, wherein indices of resource groups in the first resource group subset are consecutive.

17. The method according to claim 13, wherein:

the plurality of resource group subsets respectively correspond to a plurality of reference values, an index of the first resource group in the first resource group subset is related to a first reference value, and the first reference value is a reference value corresponding to the first resource group subset in the plurality of reference values, or the plurality of resource group subsets respectively belong to a plurality of resource group sets, and the control information respectively indicates the plurality of resource group subsets out of the plurality of resource group sets.

* * * * *